United States Patent [19]

Forslund, III et al.

[11] Patent Number: 5,697,193

[45] Date of Patent: Dec. 16, 1997

[54] UTILITY DISTRIBUTION SYSTEM FOR OPEN OFFICE PLANS AND THE LIKE

[75] Inventors: Carl V. Forslund, III, Grand Rapids; Thomas G. Feldpausch, Hastings; Frederick S. Faiks, Greenville, all of Mich.

[73] Assignee: Steelcase Inc., Grand Rapids, Mich.

[21] Appl. No.: 452,508

[22] Filed: May 30, 1995

Related U.S. Application Data

[62] Division of Ser. No. 63,463, May 18, 1993.

[51] Int. Cl.⁶ ........................................................ E04B 5/48
[52] U.S. Cl. ........................................ 52/220.5; 52/220.7
[58] Field of Search ........................... 52/220.1, 220.5, 52/220.7, 126.2, 126.5

[56] References Cited

U.S. PATENT DOCUMENTS

| | | |
|---|---|---|
| 3,784,042 | 1/1974 | Hadfield et al. |
| 3,978,631 | 9/1976 | Diersing . |
| 4,016,357 | 4/1977 | Abrahamsen . |
| 4,040,755 | 8/1977 | Jorgensen et al. |
| 4,065,890 | 1/1978 | Fenner . |
| 4,074,488 | 2/1978 | Ray, III . |
| 4,124,324 | 11/1978 | Augis et al. |
| 4,220,808 | 9/1980 | Fujita . |

(List continued on next page.)

FOREIGN PATENT DOCUMENTS

| | | | |
|---|---|---|---|
| 0067134 | 12/1982 | European Pat. Off. | |
| 0514862 | 11/1992 | European Pat. Off. | |
| 0517938 | 12/1992 | European Pat. Off. | |
| 517938 | 12/1992 | European Pat. Off. | 52/220.5 |
| 2647180 | 5/1990 | France . | |
| 1231330 | 12/1966 | Germany . | |
| 1909667 | 2/1965 | Norway . | |
| 1335829 | 10/1973 | United Kingdom . | |
| 2190936 | 12/1987 | United Kingdom | 52/220.5 |

OTHER PUBLICATIONS

"Network Floor" by Kyodo Electric Co. Ltd., of Tokyo, Japan (12 pgs.) dated Mar. 1987.

"Cablefloor" by Co Design of Atlanta, Georgia (2 pgs.) dated Nov. 1990.

"Suelos Elvados" by Sistemas TDM of Madrid, Spain (12pgs.) date unknown.

"Suelos Tecnico" by Sistemas TDM of Madrid, Spain (8pgs.) date unknown.

(List continued on next page.)

*Primary Examiner*—Michael Safavi
*Attorney, Agent, or Firm*—Price, Heneveld, Cooper, DeWitt & Litton

[57] ABSTRACT

A utility distribution system is provided for open office plans and other similar settings, and includes a prefabricated floor construction designed to be supported directly on a building floor. The floor construction has a hollow interior which defines at least one raceway to route utility conduits therethrough, and a floor surface on which workstations can be positioned. The utility distribution system also includes at least one utility post having a foot which mounts to the floor construction to support the utility post in a generally upstanding orientation. The foot portion of the utility post has an open area disposed above and communicating with the floor raceway. At least one utility outlet is mounted on the utility post, and is adapted to dispense a selected utility therefrom. The utility post has at least one utility channel in which utility conduits can be routed, and includes an outwardly oriented open face. The utility channel extends continuously between and communicates with the utility outlet and the open area of the foot, such that utilities can be readily provided to the workstations by pulling selected utility conduits from the floor raceway, through the open area of the foot portion of an adjacent utility post, and then laying the selected utility conduits into the utility channel portion of the utility post by insertion into the open face thereof to a location adjacent the utility outlet for connection therewith.

68 Claims, 13 Drawing Sheets

U.S. PATENT DOCUMENTS

| | | |
|---|---|---|
| 4,257,203 | 3/1981 | Propst et al. . |
| 4,296,574 | 10/1981 | Stephens . |
| 4,353,411 | 10/1982 | Harter et al. . |
| 4,442,645 | 4/1984 | Hiller et al. . |
| 4,470,232 | 9/1984 | Condevaux et al. . |
| 4,484,426 | 11/1984 | Simms . |
| 4,606,394 | 8/1986 | Bannister . |
| 4,608,066 | 8/1986 | Cadwell, Jr. . |
| 4,630,417 | 12/1986 | Collier . |
| 4,631,879 | 12/1986 | Kobayashi et al. . |
| 4,682,453 | 7/1987 | Holmgren . |
| 4,750,305 | 6/1988 | Bastian . |
| 4,771,583 | 9/1988 | Ball et al. . |
| 4,773,196 | 9/1988 | Yoshida et al. . |
| 4,863,223 | 9/1989 | Weissenbach et al. . |
| 4,883,503 | 11/1989 | Fish . |
| 5,019,672 | 5/1991 | Fish . |
| 5,052,157 | 10/1991 | Ducroux et al. . |
| 5,081,809 | 1/1992 | Thompson . |
| 5,150,554 | 9/1992 | Quinlan, Jr. et al. . |

OTHER PUBLICATIONS

"Officeflor" by Starfair Corporation, of Charlotte, NC (1pg.) date unknown.

"Doppelboden H 16" by TSC Tek Sil Concepts, Incorporated of Haddonfield, New Jersey (2pgs.) date unknown.

"Norina Cavity–Floor . . . " by Norina, Bautechnik GmbH, of Nurnberg, Germany (2pgs.) date unknown.

"Bravo Access Floors" by Buyline (1 pg.) date unknown.

"Introducing Access" by CTEC, of Grand Rapids, Michigan (2 pgs.) date unkow.

"Access Flooring" by Westinghouse and DEF Industries, Inc., of Dayton, Ohio (2 pgs.) date unknown.

"Q–Floor/Taproute" by Robertson (2 pgs.) date unknown.

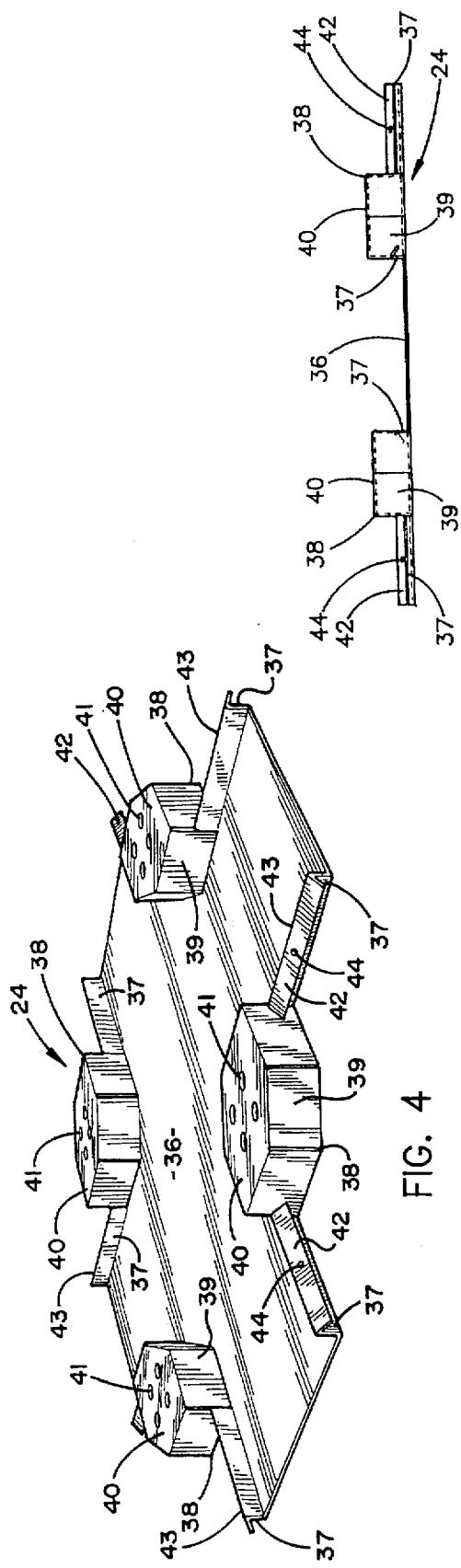
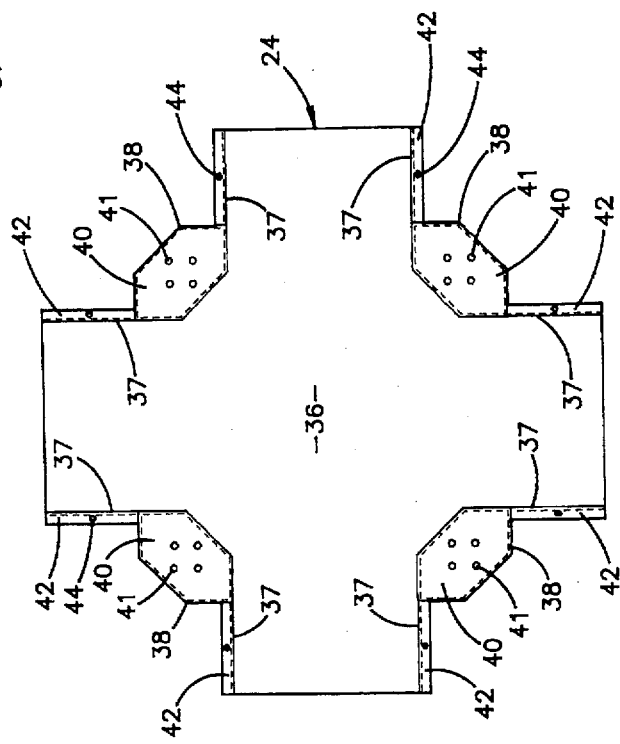
FIG. 4
FIG. 5
FIG. 6

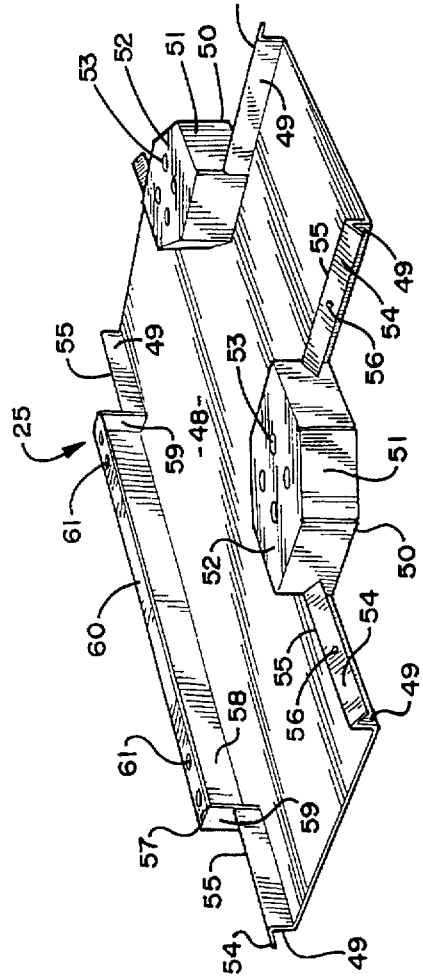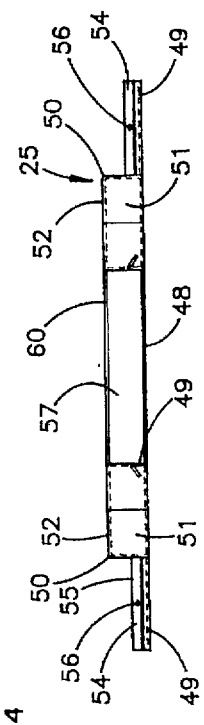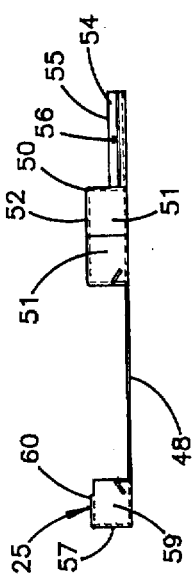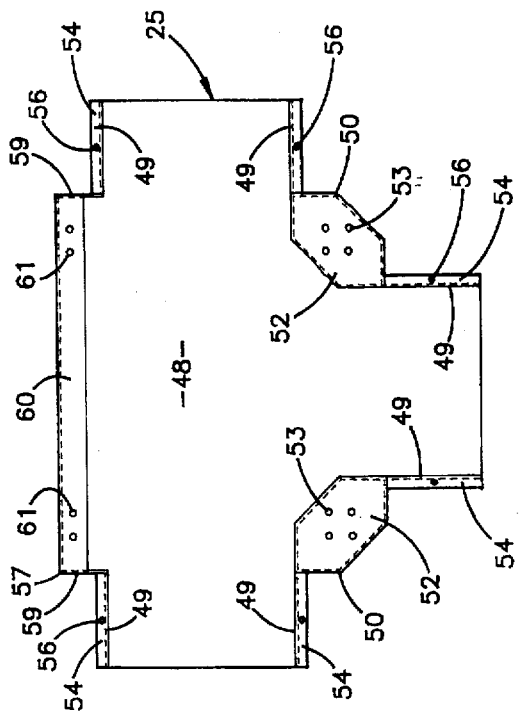

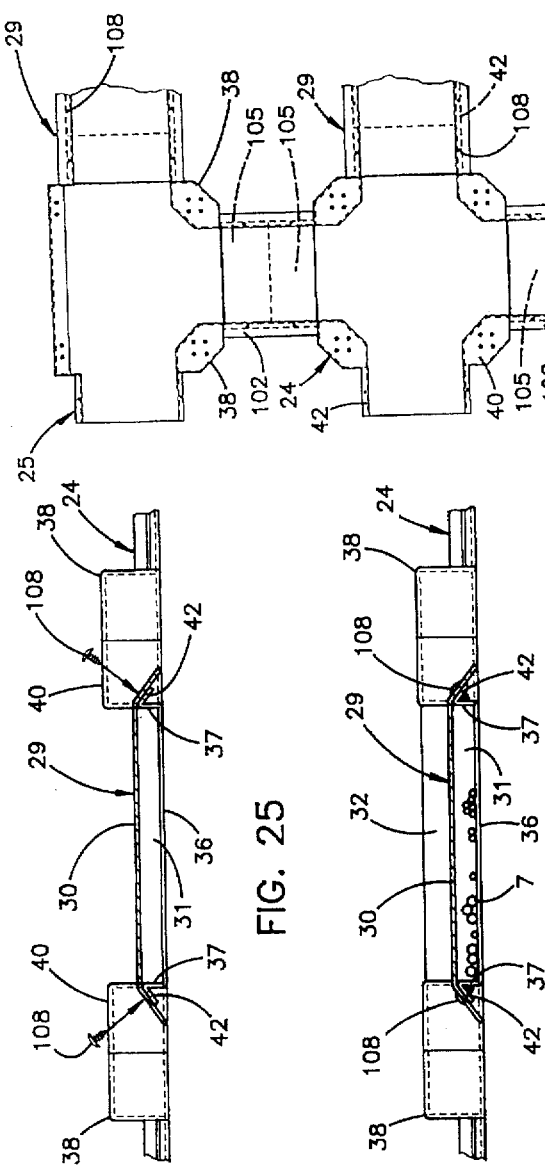
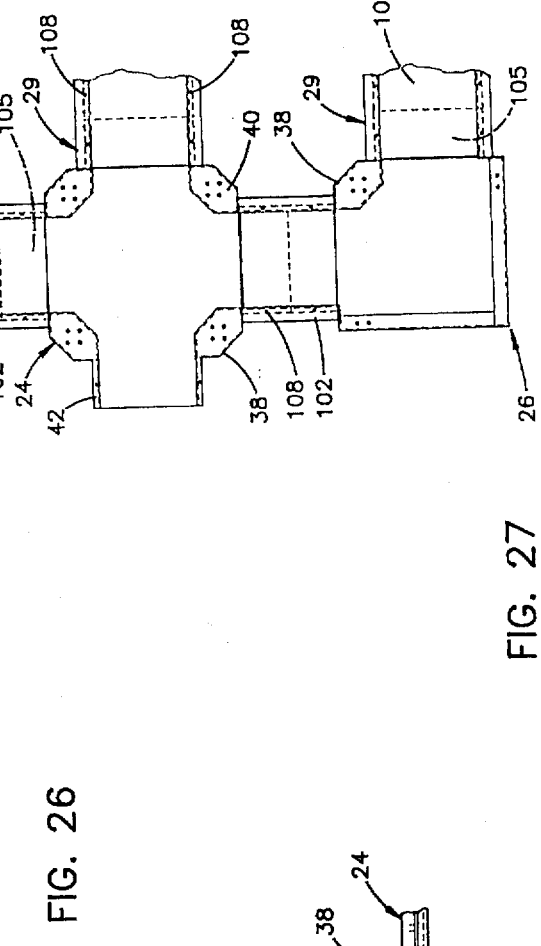
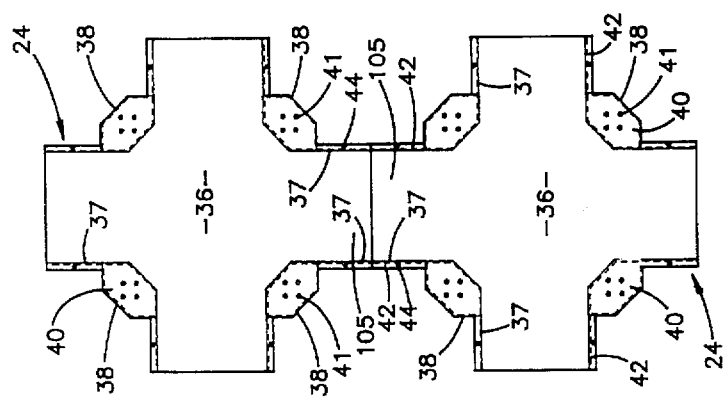
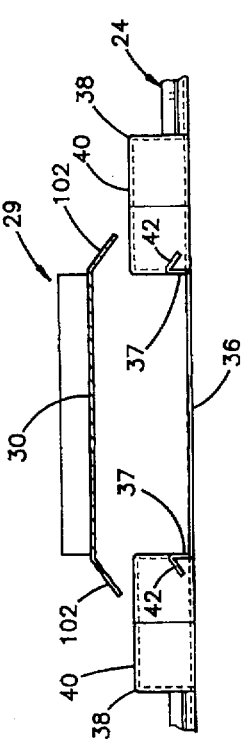
FIG. 23
FIG. 24
FIG. 25
FIG. 26
FIG. 27

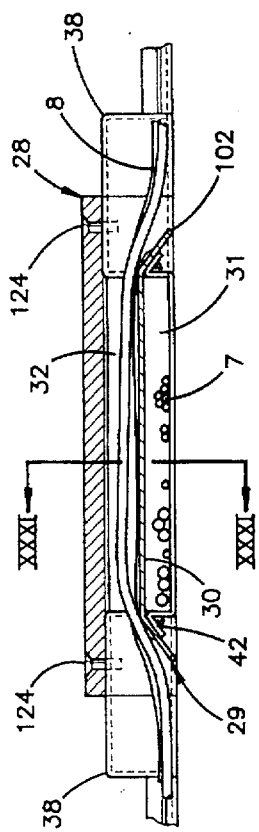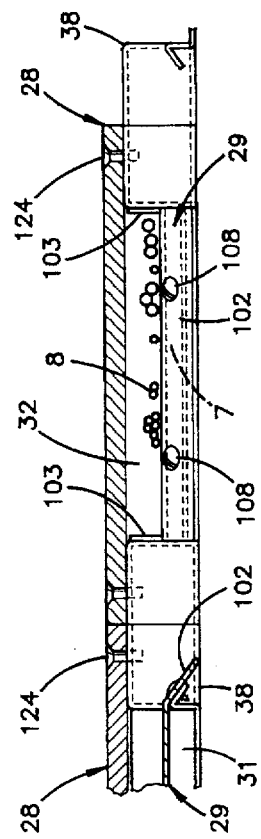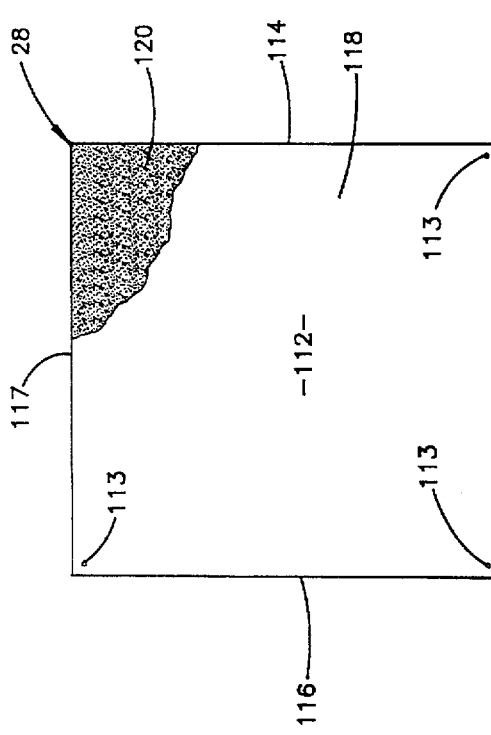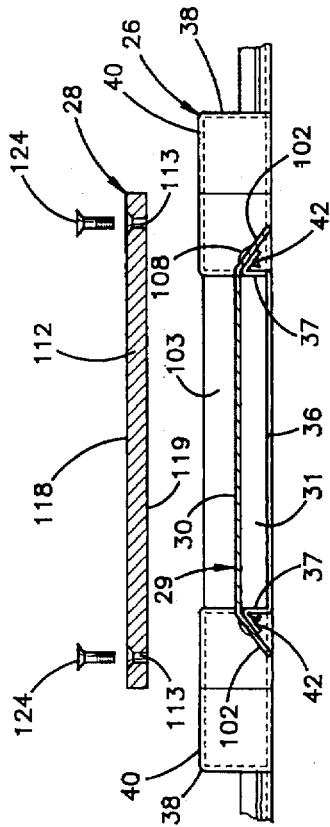

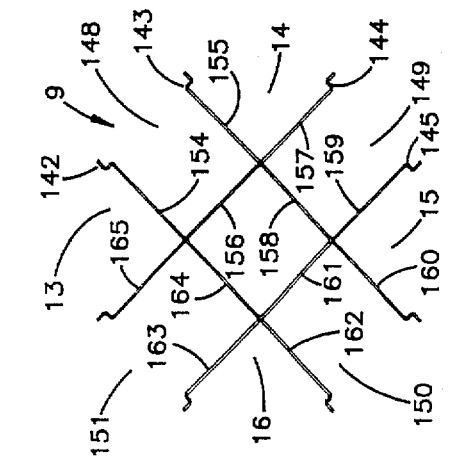
FIG. 34
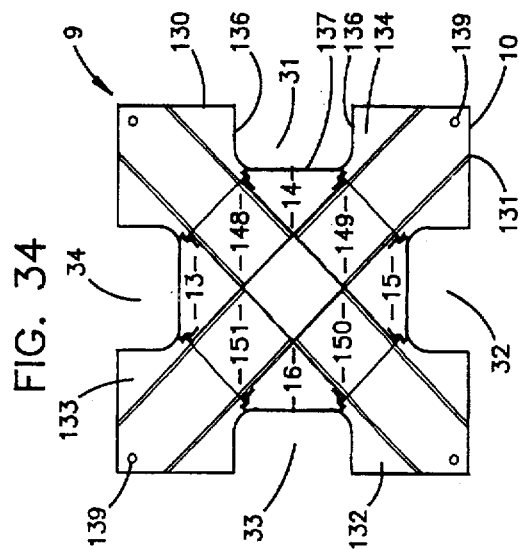
FIG. 35
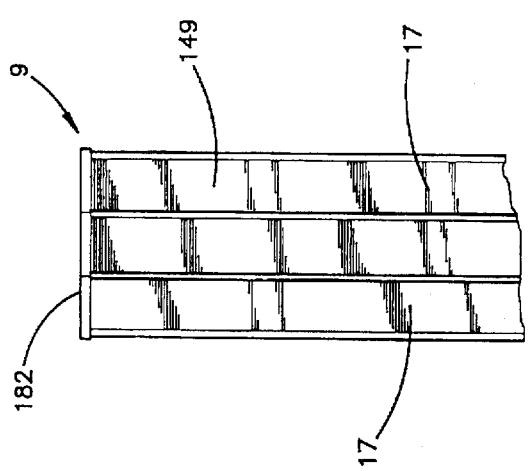
FIG. 33
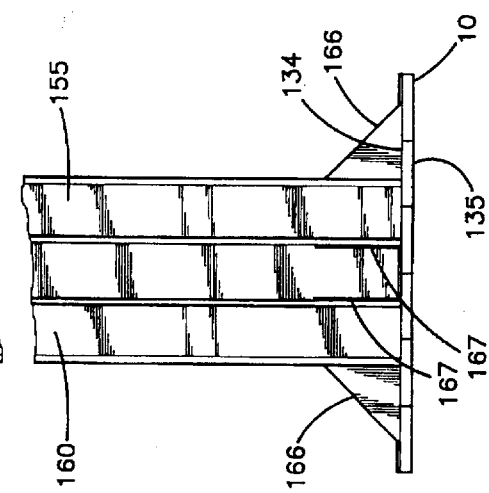
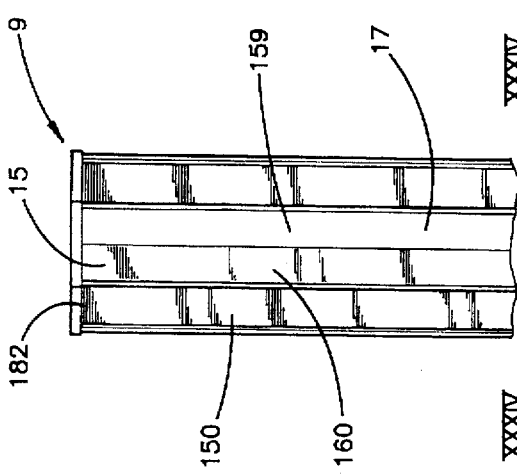
FIG. 32
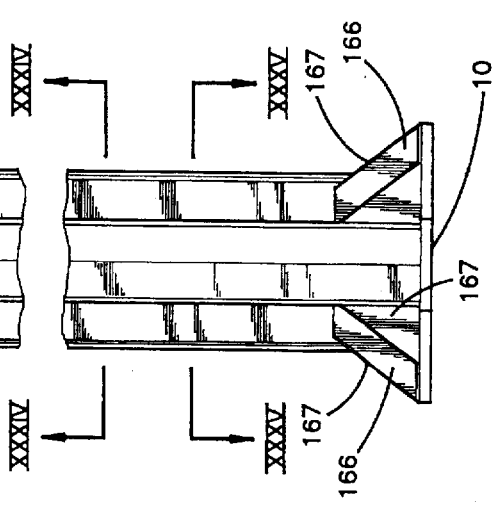

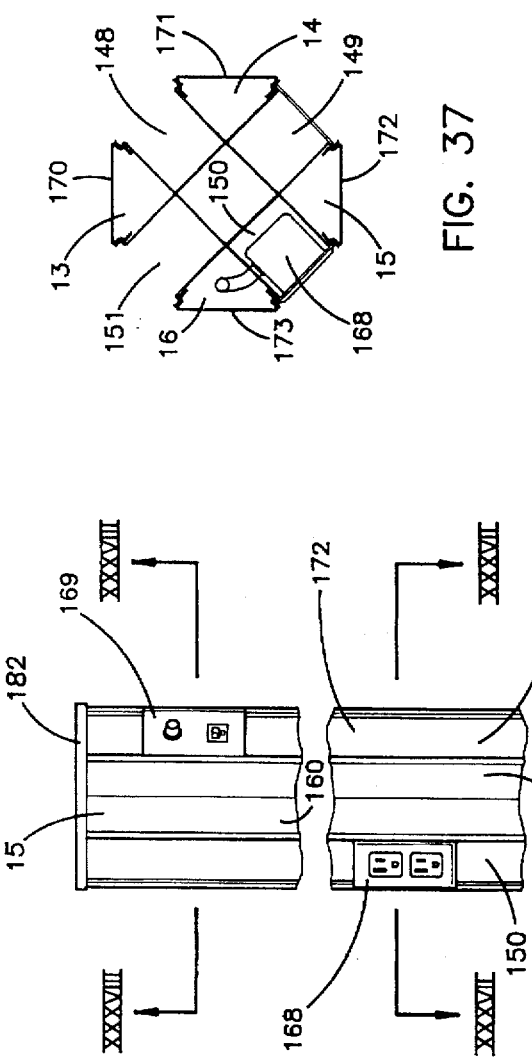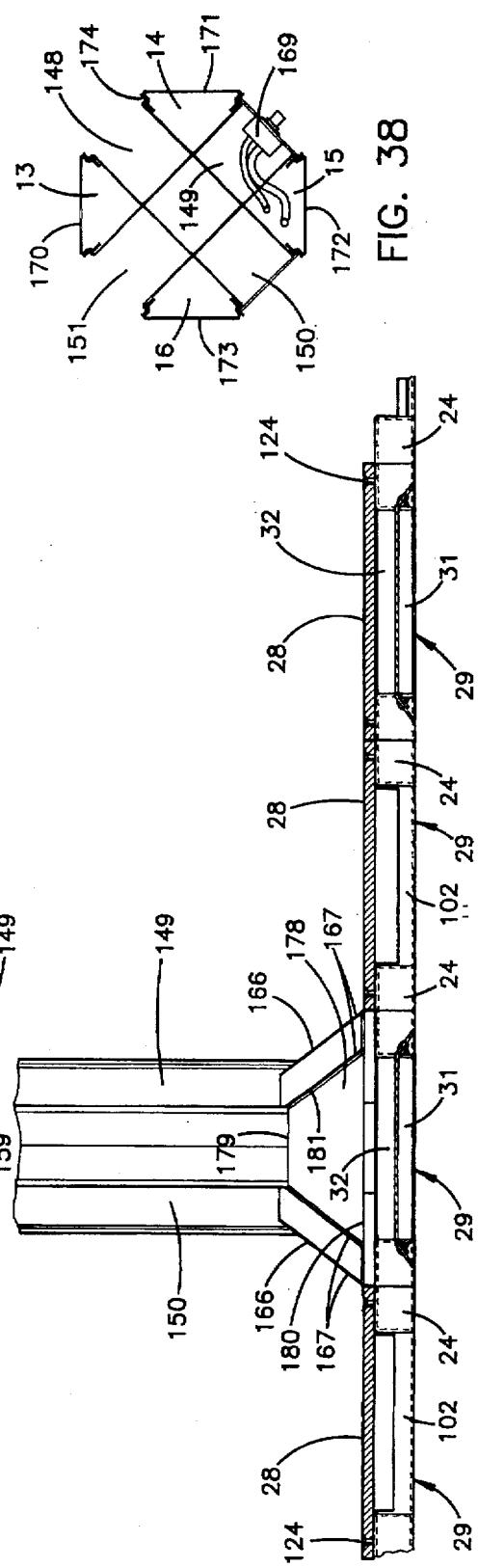

UTILITY DISTRIBUTION SYSTEM FOR OPEN OFFICE PLANS AND THE LIKE

This is a divisional of co-pending application Ser. No. 08/063,463, filed on May 18, 1993.

CROSS-REFERENCES TO RELATED PATENTS

The present application is related to commonly assigned, U.S. Pat. No. 5,483,776, entitled UTILITY FLOOR CONSTRUCTION, U.S. Pat. No. 5,511,348, entitled FURNITURE SYSTEM, and U.S. Pat. No. 5,282,341, entitled DYNAMIC WORKSPACE MODULE, all of which are hereby incorporated by reference.

BACKGROUND OF THE INVENTION

The present invention relates to the distribution of utilities in open office plans and the like, and in particular to a prefabricated floor construction and utility post arrangement.

Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces into individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

SUMMARY OF THE INVENTION

One aspect of the present invention is to provide a utility distribution system for open office plans and other similar environments. The utility distribution system includes a prefabricated floor construction designed to be supported on a building floor, and having a hollow interior portion that defines at least one raceway to route utility conduits therethrough, and a floor surface on which workstations may be positioned. The distribution system also includes at least one utility post having a foot which mounts to the floor construction to support the same in a generally upstanding orientation. The foot portion of the utility post has an open area disposed above and communicating with the floor raceway. At least one utility outlet is mounted on the utility post, and is adapted to dispense a selected utility therefrom. The utility post also has at least one utility channel in which utility conduits can be routed, and includes an outwardly oriented open face. The utility channel extends continuously between and communicates with the utility outlet and the open area of the foot, such that utilities can be readily provided to the workstations by pulling selected utility conduits from the floor raceway, through the open area of the foot portion of the utility post, and laying them into the utility channel of the utility post by insertion into the open face thereof to a location adjacent the utility outlet for connection therewith.

Another aspect of the present invention is a utility floor construction, comprising a plurality of floor base members or pans supported on a floor surface in a mutually adjacent, lattice-like arrangement. Each of the floor pans has a generally U-shaped configuration and a base which defines at least a portion of a primary raceway that extends generally continuously throughout the floor construction. A plurality of rigid cover plates are supported on the floor pans in a mutually adjacent arrangement to generally enclose the primary raceway, and define a continuous floor surface thereover. A plurality of connector bridges extend between adjacent ones of the floor pans, and are attached thereto to physically interconnect the same. The connector bridges each include a separator plate that is positioned a spaced apart distance above the bases of the adjacent floor pans to form thereunder a lower connector raceway, which in combination with the primary raceway, defines a first utility raceway adapted to receive and retain a first utility therein. The separator plate is disposed a spaced apart distance below the overlying covering plates to form thereover an upper connector raceway oriented generally perpendicular to the lower connector raceway, which in combination with the primary raceway, defines a second utility raceway adapted to receive and retain a second utility therein. In this fashion, the first and second utilities can be routed through the floor construction, while being physically separated from one another.

The principal objects of the present invention are to provide a utility distribution system for open office plans, and other similar environments. The utility distribution system includes a prefabricated floor construction which is adapted to route multiple utilities therethrough, and is also capable of separating at least two different types of utilities to avoid interference between the same. Utility posts are mounted on the floor construction, and serve to distribute various utilities to workstations positioned on the floor construction. The present utility distribution system is very versatile, adaptable, efficient in use, capable of a long operating life, and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 4 is a perspective view of an X-shaped floor pan portion of the floor construction.

FIG. 5 is a side elevational view of the X-shaped floor pan.

FIG. 6 is a top plan view of the X-shaped floor pan.

FIG. 7 is a perspective view of a T-shaped floor pan portion of the floor construction.

FIG. 8 is front elevational view of the T-shaped floor pan.

FIG. 9 is a top plan view of the T-shaped floor pan.

FIG. 10 is a side elevational view of the T-shaped floor pan.

FIG. 23 is a top plan view of a pair of X-shaped floor pans positioned adjacent one another prior to interconnection.

FIG. 24 is a fragmentary cross-sectional view of the X-shaped floor pans shown in FIG. 23, with a connector bridge positioned thereover for interconnecting the same.

FIG. 25 is a fragmentary, cross-sectional view of the X-shaped connector pans shown in FIG. 23, wherein the connector bridge is positioned bridging the same prior to attachment.

FIG. 26 is a fragmentary, cross-sectional view of the X-shaped connector pans shown in FIG. 23, wherein the connector bridge is attached thereto, and wires are routed through associated raceways.

FIG. 27 is a fragmentary, top plan view of a plurality of different types of floor pans interconnected by associated bridges prior to routing cabling therethrough.

FIG. 28 is a top plan view of a cover plate portion of the floor construction.

FIG. 29 is a fragmentary, cross-sectional view of an X-shaped floor pan with an associated cover plate positioned thereover prior to attachment.

FIG. 30 is a fragmentary, cross-sectional view of the X-shaped floor pan and cover plate shown in FIG. 29, wherein the cover plate is fastened to the floor pan, and wires are routed through raceways formed therein.

FIG. 31 is a cross-sectional view of the floor construction shown in FIG. 30, taken along the line XXXI—XXXI, FIG. 30.

FIG. 32 is a front elevational view of the utility post.

FIG. 33 is a side elevational view of the utility post.

FIG. 34 is a horizontal cross-sectional view of the utility post, taken along the line XXXIV—XXXIV, FIG. 32.

FIG. 35 is a cross-sectional view of the utility post, taken along the line XXXV—XXXV, FIG. 34.

FIG. 36 is a partially schematic, fragmentary cross-sectional view of the floor construction with a utility post mounted thereon.

FIG. 37 is a cross-sectional view of the utility post shown in FIG. 36, taken along the line XXXVII—XXXVII, FIG. 36.

FIG. 38 is a cross-sectional view of the utility post shown in FIG. 36, taken along the line XXXVIII—XXXVIII, FIG. 36.

DETAILED DESCRIPTION OF THE PREFERRED EMBODIMENTS

Figure 1:
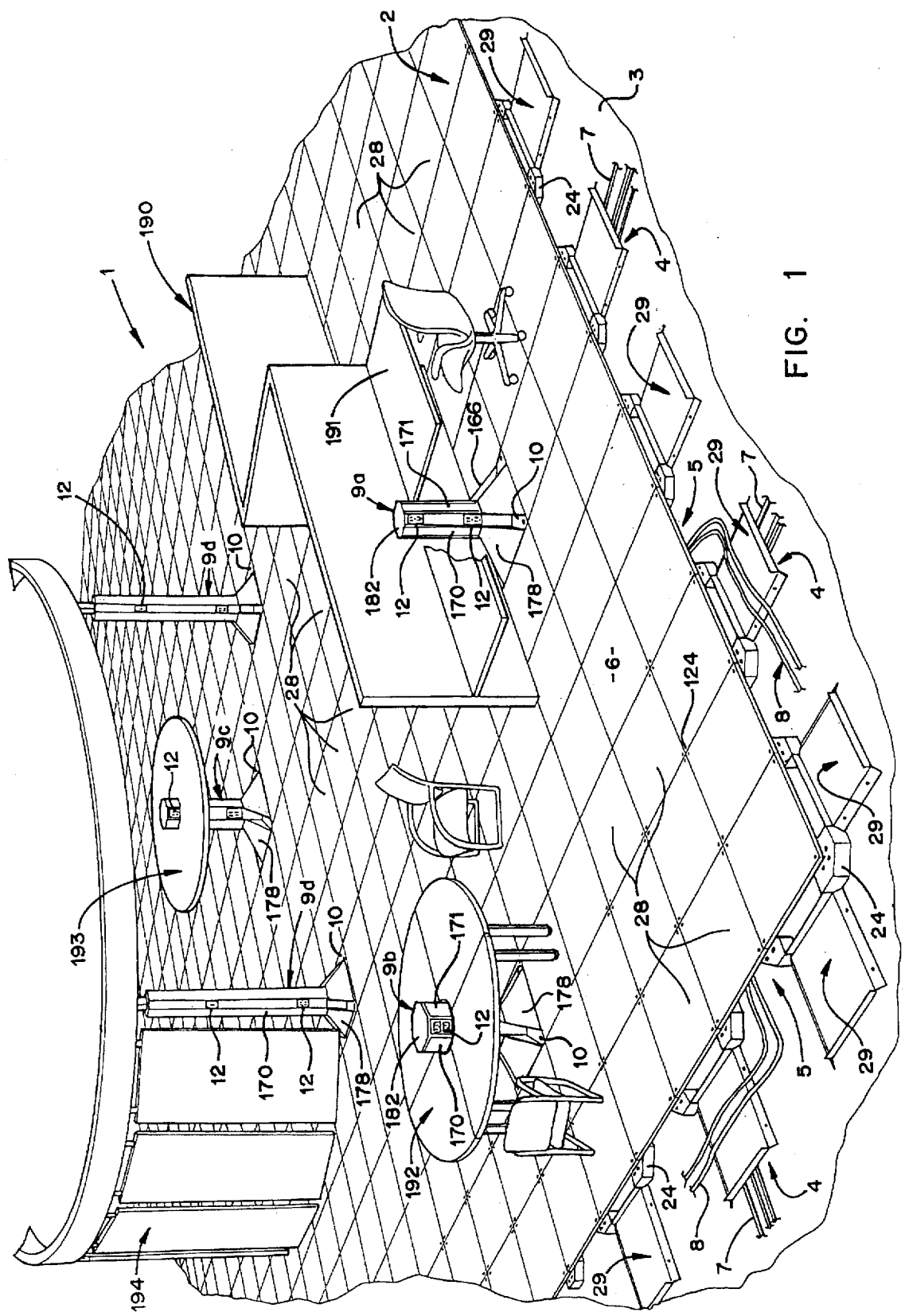
FIG. 1 is a fragmentary perspective view of a utility distribution system embodying the present invention, comprising a prefabricated floor construction, and associated utility posts.
Figure 2:
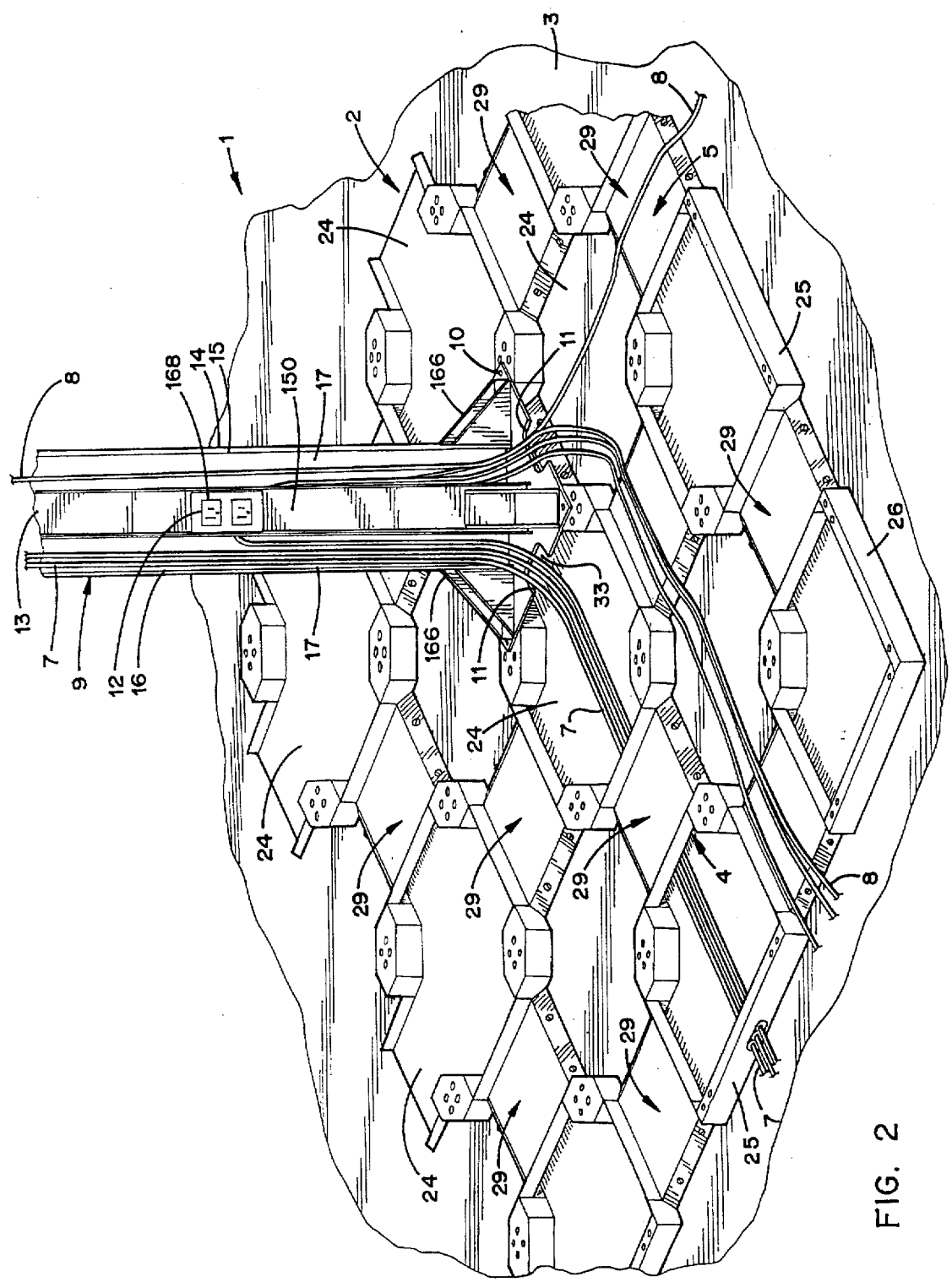
FIG. 2 is a fragmentary perspective view of the floor construction and one of the utility posts, wherein cover plate portions of the floor construction have been removed to reveal internal construction.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a utility distribution system embodying the present invention, which is particularly designed for use in open office plans, and other similar settings and environments. In the illustrated example, utility distribution system 1 includes a prefabricated floor construction 2 configured to be supported on a building floor 3. Floor construction 2 has a hollow interior arrangement that defines raceways 4 and 5 to route utility conduits 7 and 8 therethrough, and a floor surface 6 on which workstations may be positioned. It is to be understood that the term "utility conduit" as used herein contemplates various devices and arrangements for transmitting utilities between two points, such as air ducts, fluid pipes, electrical wires, fiber optic cables, and the like. The illustrated distribution system 1 also includes at least one utility post 9 having a foot portion 10 which mounts to floor construction 2 to support utility post 9 in a generally upstanding orientation. The foot portion 10 of utility post 9 has an open area 11 (FIG. 2) disposed above and communicating with at least one of the floor raceways 4 and 5. At least one utility outlet 12 is mounted on utility post 9, and is adapted to dispense selected utility therefrom, such as electrical power, communication signals, HVAC, condition water, etc. Utility post 9 has utility channels 13-16, each having an outwardly oriented open face 17, and being shaped so that one or more of the utility conduits 7 or 8 can be routed therein. Each one of the utility channels 13-16 extends continuously between and communicates with an associated utility outlet 12 and an associated open area 11 of utility post foot 10, such that utilities can be readily provided to the workstations by simply pulling selected utility conduits 7 and 8 from floor raceways 4 and 5, through the open areas 11 in the foot portion 10 of an adjacent utility post 9, and then laying them into the utility channels 13-16 of utility post 9 by insertion into the open faces 17 thereof to a location adjacent the utility outlets 12 for connection therewith.

In the illustrated example, floor construction 2 (FIG. 3) is a prefabricated assembly that is designed to be supported directly on top a conventional building floor. Floor construction 2 includes a plurality of floor base members or pans 24-27, which are abuttingly supported of the floor surface 6 in a mutually adjacent, lattice-like arrangement. Each of the floor pans 24-27 has a generally U-shaped configuration, with a base that defines at least a portion of the raceway 4 extending generally continuously throughout floor construction 2. Rigid cover plates 28 are supported on floor pans 24-27 in a mutually adjacent arrangement to generally enclose raceway 4, and define the continuous floor surface 6 thereover. A plurality of connector bridges 29 extend between adjacent floor pans 24-27, and are attached thereto to physically interconnect the same. Connector bridges 29 each include a separator plate 30 (FIGS. 25 & 26) positioned a spaced apart distance above the bases of the adjacent floor pans 24-27 to form thereunder a lower connector raceway 31, which in combination with raceway 4, is adapted to receive a first type of utility therein, such as power conduits 7. The separator plate 30 of connector bridge 29 is positioned a spaced apart distance below the overlying cover plates 28 (FIGS. 30 & 31) to form thereover an upper connector raceway 32, oriented generally perpendicular to the lower connector raceway 31, which in combination with raceway 5 is adapted to receive and retain a second utility therein, such as communication or signal conduits 8. In this fashion, the power conduits 7 and signal conduits 8 can be routed through floor construction 2, while being physically separated from one another, so as to avoid both physical and/or functional interference between the same. It is to be understood that floor pans 24-27 may take a variety of different shapes and configurations, and in the examples illustrated herein, floor construction 2 includes an X-shaped floor pan 24, a T-shaped floor pan 25, an L-shaped floor pan 26, and a diagonal floor pan 27, all of which are mutually interconnected by connector bridges 29, and enclosed by cover plates 28, as discussed in greater detail hereinafter.

With reference to FIGS. 4-6, the illustrated X-shaped floor pan 24 is rigid, and has a generally U-shaped vertical cross-sectional configuration, comprising an X-shaped base 36, and four pairs of upstanding sidewalls 37. X-shaped floor pan 24 has four raised pedestals 38 positioned adjacent each exterior corner of pan base 36, which are configured to support cover plates 28 therein. Each pedestal 38 has a generally hexagonal top plan configuration, with six sidewalls 39, and an upper pad 40 with four fastener apertures 41 therethrough arranged in a square pattern. Each pair of upstanding pan sidewalls 37 associated with X-shaped floor pan 24 has an angle flange 42 along its upper edge 43, which angle flange 42 extends downwardly therefrom at an angle of approximately 45 degrees. Each angled flange 42 has a perpendicularly oriented fastener aperture 44 therethrough for attaching an associated connector bridge 29. The upper edge 43 of each pair of pan sidewalls 37 is positioned at a preselected distance below the upper pad 40 of the associated raised pedestal 38 to accommodate the mounting of a connector bridge 29 on angle flanges 42, and thereby separating or dividing the interior space of X-shaped floor pan 24 between lower connector raceway 31, and upper connector raceway 32, as described in greater detail below. In the illustrated example, the upper edges 43 of each pair of floor pan sidewalls 37 are positioned at around the vertical midpoint of the associated raised pedestal 38.

With reference to FIGS. 7-10, the illustrated T-shaped floor pan 25 is rigid, and has a generally U-shaped vertical cross-sectional configuration, comprising a T-shaped base 48, and three pairs of upstanding sidewalls 49. T-shaped floor pan 25 has two raised pedestals 50 positioned adjacent the interior facing corners of pan base 48, which are configured to support cover plates 28 thereon. Each pedestal 50 has a generally hexagonal top plan configuration, with six sidewalls 51, and an upper pad 52 with four fastener apertures 53 therethrough arranged in a square pattern. Each pair of upstanding pan sidewalls 49 associated with T-shaped floor pan 25 has an angle flange 54 along its upper edge 55, wherein angle flange 54 extends downwardly therefrom at an angle of approximately 45 degrees. Each angle flange 54 has a perpendicularly oriented fastener aperture 56 therethrough for attaching an associated connector bridge 29. The upper edge 55 of each pair of pan sidewalls 49 is positioned a preselected distance below the upper pad 52 of the associated raised pedestal 50 to accommodate the mounting of connector bridge 29 on angle flanges 54, and thereby separating or dividing the interior space in T-shaped floor pan 25 between lower connector raceway 31, and upper connector raceway 32, as described in greater detail below. In the illustrated example, the upper edges 55 of each pair of floor pan sidewalls 49 are positioned at around the vertical midpoint of the associated raised pedestal 50. A raised support channel 57 extends along the exterior edge of pan base 48, and includes a sidewall 58, end walls 59, and an upper flange 60 positioned generally level with the upper pads 52 of pedestals 50. The upper flange 60 of support channel 57 is shaped to support cover plates 28 thereon, and includes four perpendicularly oriented fastener apertures 61 therethrough to facilitate connection with cover plates 28.

Figure 12:
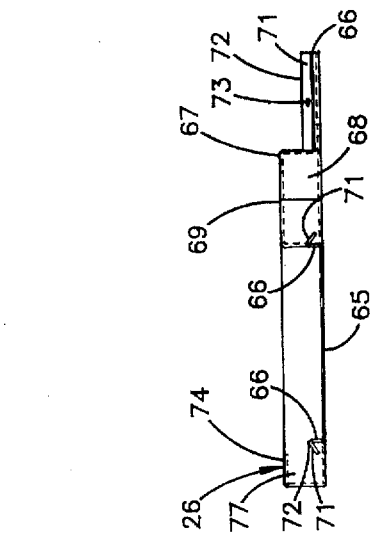
FIG. 12 is a side elevational view of the L-shaped floor pan.
Figure 11:
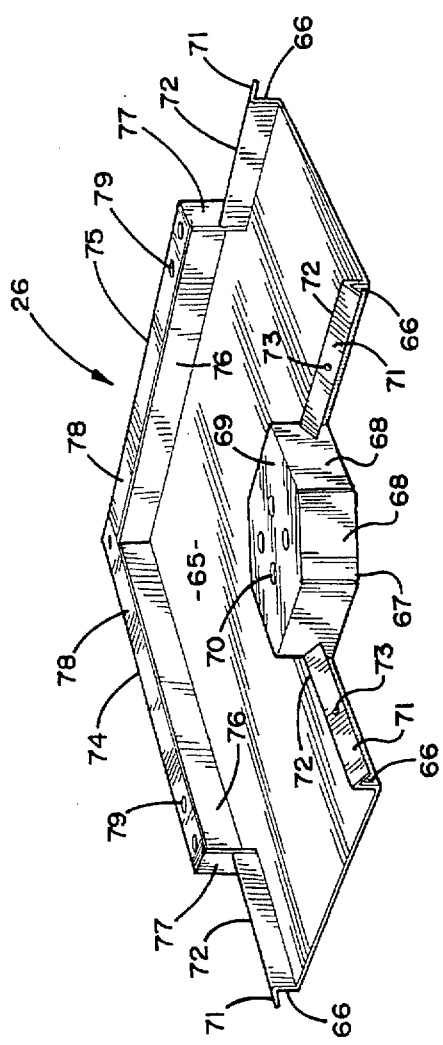
FIG. 11 is a perspective view of an L-shaped floor pan portion of the floor construction.
Figure 13:
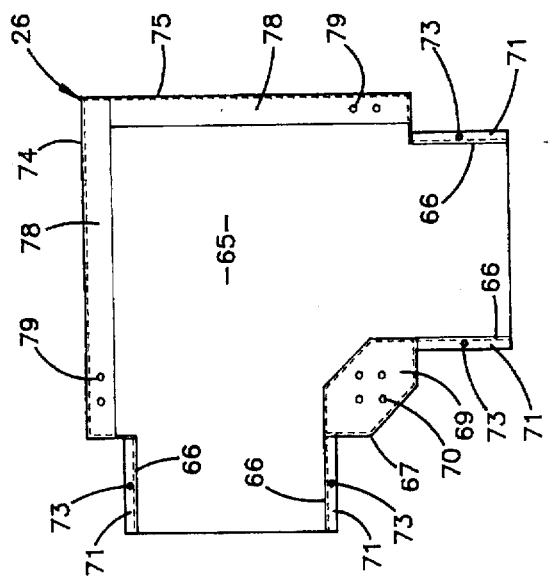
FIG. 13 is a top plan view of the L-shaped floor pan.
Figure 15:
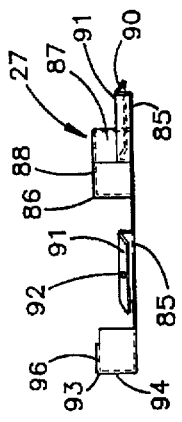
FIG. 15 is a side elevational view of the diagonal floor pan.
Figure 17:
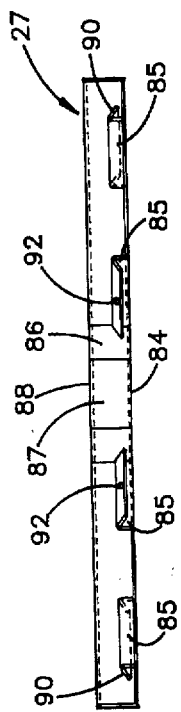
FIG. 17 is a front elevational view of the diagonal floor pan.
Figure 14:
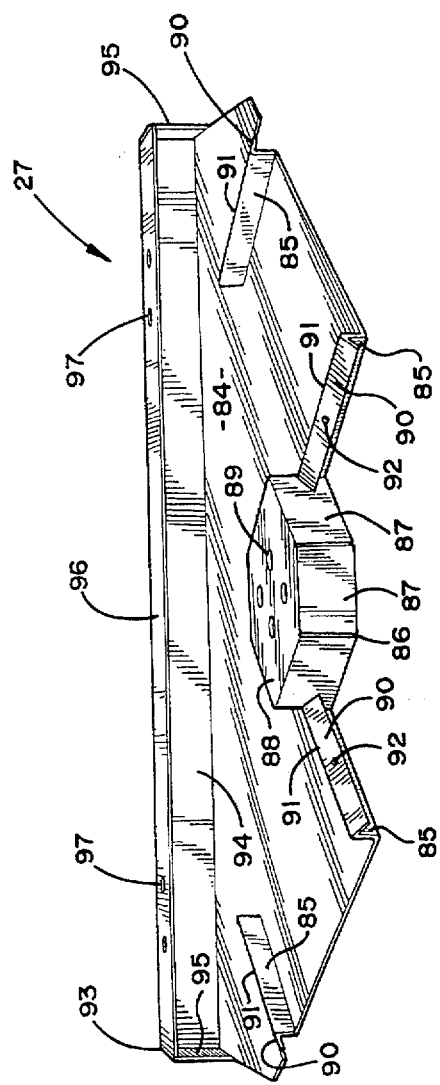
FIG. 14 is a perspective view of a diagonal floor pan portion of the floor construction.
Figure 16:
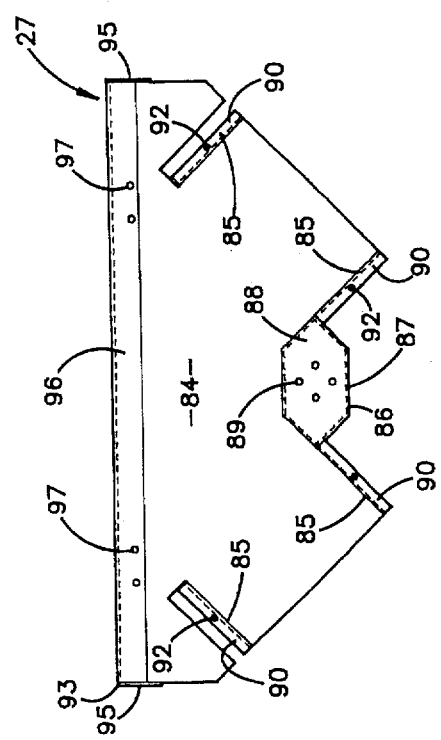
FIG. 16 is a top plan view of the diagonal floor pan.
Figure 19:
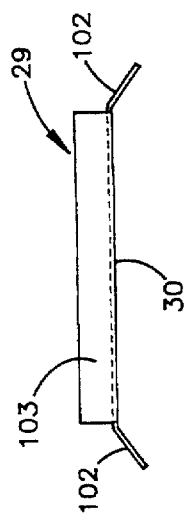
FIG. 19 is a front elevational view of the connector bridge.
Figure 21:
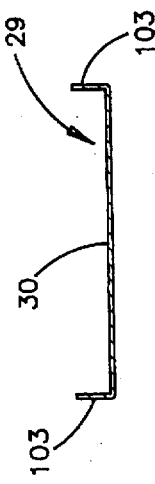
FIG. 21 is a cross-sectional view of the connector bridge, taken along the line XXI—XXI, FIG. 20.
Figure 22:
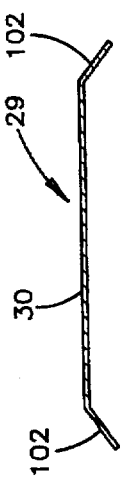
FIG. 22 is a cross-sectional view of the connector bridge, taken along the line XXII—XXII, FIG. 20.
Figure 18:
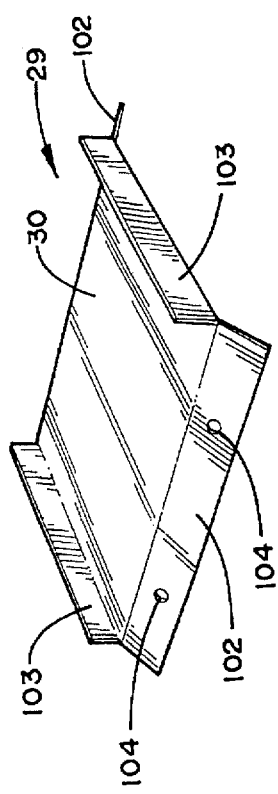
FIG. 18 is a perspective view of a connector bridge portion of the floor construction.
Figure 20:
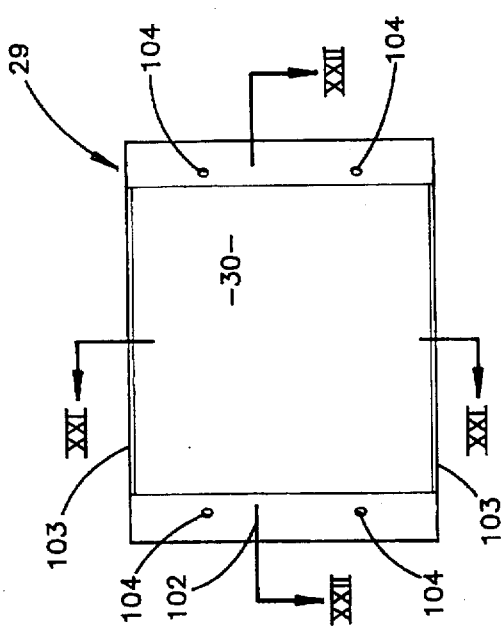
FIG. 20 is a top plan view of the connector bridge.

With reference to FIGS. 11-13, the illustrated L-shaped floor pan 26 is rigid, and has a general U-shaped vertical cross-sectional configuration, comprising an L-shaped base 65, and two pairs of upstanding sidewalls 66. L-shaped floor pan 26 has one raised pedestal 67 positioned adjacent the interior facing corner of pan base 65, and is configured to support cover plates 28 thereon. Pedestal 67 has a generally hexagonal top plan configuration, with six sidewalls 68, and an upper pad 69 with four perpendicularly oriented fastener apertures 70 therethrough arranged in a square pattern. Each pair of upstanding pan sidewalls 66 associated with L-shaped floor pan 26 has an angle flange 71 extending along its upper edge 72, wherein angle flange 71 extends downwardly therefrom at an angle of approximately 45 degrees. Each angle flange 71 has a perpendicularly oriented fastener aperture 73 therethrough for attaching an associated connector bridge 29. The upper edge 72 of each pan sidewall 66 is positioned a preselected distance below the upper pad 69 of raised pedestal 69 to accommodate the mounting of a connector bridge 29 on angle flanges 71, and thereby separating or dividing the interior space of L-shaped floor pan 26 between lower connector raceway 31, and upper connector raceway 32, as described in greater detail below. In the illustrated example, the upper edges 72 of floor pan sidewalls 66 are positioned at around the vertical midpoint of raised pedestal 67. A pair of raised support channels 74 and 75 extend along the exterior facing side edges of pan base 65, and each includes a sidewall 76, endwalls 77, and an upper flange 78 positioned generally level with the upper pad 69 of pedestal 67. The upper flange 78 of each support channel 74 and 75 is shaped to support cover plates 28 thereon, and includes perpendicularly oriented fastener apertures 79 to facilitate detachable connection with cover plates 28.

With reference to FIGS. 14-17, the illustrated diagonal floor panel 27 is rigid, and has a generally U-shaped vertical cross-sectional configuration, comprising a W-shaped base 84, and two pairs of upstanding sidewalls 85. Diagonal floor pan 27 has one raised pedestal 86 positioned adjacent the interior facing corner of pan base 84, and is configured to support cover plates 28 thereon. Pedestal 86 has a generally hexagonal top plan configuration, with six sidewalls 87, and upper pad 88 with four perpendicularly oriented fastener apertures 89 therethrough arranged in a square pattern. Each pair of upstanding pan sidewalls 85 associated with diagonal floor pan 27 has an angle flange 90 along its upper edge 91, wherein angle flange 90 extends downwardly therefrom at an angle of approximately 45 degrees. Each angle flange 90 has a perpendicularly oriented fastener aperture 92 therethrough for attaching an associated connector bridge 29. The upper edge 91 of both pairs of pan sidewalls 85 is positioned a preselected distance below the upper pad 88 of pedestal 86 to accommodate the mounting of a connector bridge 29 on angle flanges 90, and thereby separating or dividing the interior space of diagonal floor pan 27 between lower connector raceway 31, and upper connector raceway 32, as described in greater detail below. In the illustrated example, the upper edges 91 of both pairs of floor pan sidewalls 85 are positioned at around the vertical midpoint of raised pedestal 86. A raised support channel 93 extends along the exterior facing side edge of pan base 84, and includes a sidewall 94, endwalls 95, and an upper flange 96 positioned generally level with the upper pad 88 of pedestal 86. The upper flange 96 of support channel 93 is shaped to support cover plates 28 thereon, and includes perpendicularly oriented fastener apertures 97 to facilitate the detachably connection of cover plates 28.

Floor pans 24-27 may be constructed from formed sheet metal, molded plastic, and other similar arrangements, and are preferably capable of effectively isolating various electrical wires, such as power conduits. 7 and signal conduits 8 from one another. Although floor pans 24-27 are rigid to securely support cover plates 28 thereon, due to their modular construction, they will generally conform to an existing building floor surface 6, even when the same is not precisely level.

With reference to FIGS. 18-22, the illustrated connector bridge 29 is rigid, and has a generally U-shaped vertical cross-sectional configuration, comprising a flat or planar separator plate 30, having a pair of side flanges 102 depending from one pair of opposite side edges of plate 30, and a pair of upper flanges 103 upstanding from the opposite pair of side edges of plate 30. Side flanges 102 are oriented at an angle of approximately 45 degrees with respect to separator plate 30, extend generally continuously therealong, and each includes a pair of perpendicularly oriented fastener apertures 104 therethrough to facilitate connection with floor pans 24-27. Upper flanges 103 are oriented substantially perpendicular with respect to separator plate 30, and extend generally continuously along the side edges thereof. Like floor pans 24-27, connector bridge 29 may be constructed from formed sheet metal, molded plastic, or other similar arrangements, and is preferably capable of effectively isolating various electrical wires, such as power conduits 7 and signal conduits 8 from one another.

With reference to FIGS. 23-27, floor construction 2 is assembled in the following manner. Floor pans 24-27 are selected and arranged on the building floor surface 6 in the desired configuration, such as the arrangements shown in FIGS. 2 and 3. T-shaped floor pans 25 are generally arranged about the periphery or marginal portion of the floor construction 2, while L-shaped floor pans 26 are typically positioned at each right angle corner thereof. Diagonal floor pans 27 may be positioned about the marginal portion of a floor construction 2 which has one side disposed at a 45 degree angle with respect to the remaining sides. X-shaped floor pans 25 are typically positioned interior of the marginal portion of floor construction 2. Floor construction 2 can be arranged so that it covers the entire expanse of building floor 3, or can be configured to cover only selected areas thereof, so as to provide one or more utility pads that are located strategically throughout the open plan.

In all such embodiments, floor pans 24-27 (FIGS. 23-27) are arranged on building floor 3, such that the end edges of their associated bases are positioned adjacent one another in the manner illustrated in FIG. 23. Connector bridges 29 are then positioned over the joint formed between adjacent floor pans 24-27 in the manner illustrated in FIGS. 24-25. At each joint, the side flanges 102 of connector bridge 29 are positioned in abutment with the angle flanges of associated pan sidewalls, such as the angle flanges 42 of the X-shaped pan sidewalls 37 shown in FIGS. 24-26. Fasteners 108 are then inserted through the apertures 104 of connector bridge 29 and into the underlying apertures 44 in angle flanges 42, so as to securely interconnect adjacent floor pans 24-27 in their selected orientation, as illustrated in FIG. 27.

As best illustrated in FIGS. 25 & 26, the attachment of a connector bridge 29 to two adjacent floor pans 24-27 not only physically interconnects the same, but also assists in defining connector portions of the two utility raceways 4 and 5, which extend throughout floor construction 2. For example, when the two X-shaped floor pans 24 shown in FIG. 23 are interconnected by a connector bridge 29, as shown in FIG. 26, the interconnected leg portions 105 of pan bases 36 are enclosed by separator plate 30, such that pan base 36, pan sidewalls 37 and bridge separator plate 30 combine to create a fully enclosed raceway which is identified herein as lower connector raceway 31. Lower connector raceway 31 communicates directly with utility raceway 4, which is formed by the interior areas of the remaining floor pans 24-27. Connector bridge 29 also forms a portion of upper connector raceway 32, which is disposed directly above lower connector raceway 31, and is oriented perpendicular therewith. The upper connector raceway 32 is also fully enclosed after floor construction 2 is installed, and is defined by bridge separator plate 30, opposite bridge flanges 103, and cover plate 28. Upper connector raceway 32 communicates directly with utility raceway 5, which is formed by that space disposed beneath cover plates 28, and exterior to floor pans 24-27. In the illustrated example, utility raceway 4 is particularly designed to route electrical power conduits 7 through floor construction 2, while utility raceway 5 is particularly designed to route data and/or communication cables through floor construction 2.

After the selected floor pans 24-27 are interconnected by connector bridges 29 in the manner shown in FIGS. 23-27, and before assembly of cover plates 28, an initial utility installation may be made in floor construction 2. In the illustrated example, electrical power conduits 7 and signal cables 8 are installed in utility raceways 4 and 5 respectively in a fashion designed to provide utilities to each planned workstation, or in a predetermined plan which routes the utilities to each possible workstation location. In the floor construction shown in FIGS. 1-3, signal cables 8 can be simply laid in position in raceway 5 by routing them over that portion of the building floor disposed between adjacent floor pans 24-27, and over the separator plates 30 of selected connector bridges 29, through upper connector raceways 32, in a somewhat zigzag pattern. Electrical power conduits 7 are routed through raceway 4 by laying the same into the interior of floor pans 24-27, and threading the wires under the separator plates 30 of selected connector bridges, through lower connector raceways 31, in a checkerboard pattern. It is to be noted that in some installations, it may be possible to lay power conduits 7 in floor pans 24-27 before connector bridges 29 are attached, so as to avoid threading the wires through lower connector raceways 31.

With references to FIGS. 28-31, each of the illustrated cover plates 28 comprises a rigid base plate 112 having a substantially square top plan configuration, with four perpendicularly oriented fastener apertures 113 extending therethrough adjacent each corner of base plate 112. Each base plate 112 includes opposite side edges 114-117, and planar, mutually parallel upper and lower surfaces 118 & 119 respectively. In the example illustrated in FIG. 28, a segment of carpet 120, or other similar floor covering is adhered to the upper surface 118 of base plate 112. Base plate 112 may be constructed of sheet metal, plastic, or other similar materials which are capable of supporting substantial weight thereon without sagging.

Figure 3:
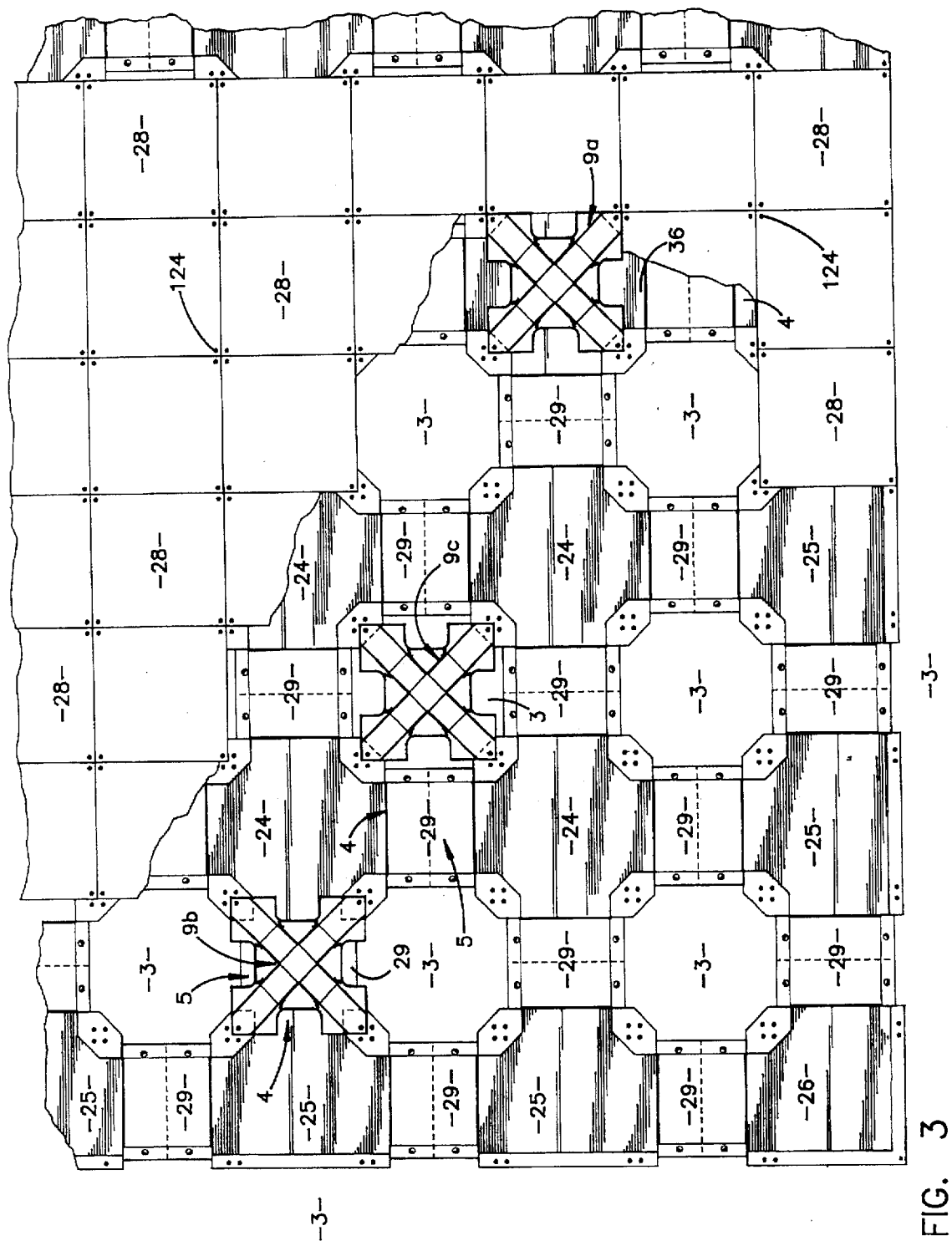
FIG. 3 is a fragmentary top plan view of the utility distribution system.

Cover plates 28 are assembled over the selected floor pans 24-27 to fully enclose floor construction 2, as shown in FIGS. 1 and 3. Cover plates 28 are juxtaposed side-by-side on floor pans 24-27 to form a continuous or uninterrupted floor surface 6 on which workstations and/or other furniture may be positioned. In the X-shaped floor pans 26 shown in FIGS. 29-31, a cover plate 28 is positioned on the the four upper pads 40 of pan pedestals 38. Fasteners 124 are inserted through each of the four fastener apertures 113 in base plate 112 and mounted securely in the underlying pad apertures 41. Cover plates 28 are similarly mounted to floor pans 25-27, wherein cover plates 28 are also connected to the associated support channels, such as the support channel 57 of T-shape floor pan 25, the two support channels 74 and 75 of L-shaped floor pan 26, and the support channel 93 of diagonal floor pan 27.

Cover plates 28 not only serve to form the upper support surface 6 for floor construction 2, but also enclose the underlying floor space, which includes those areas above floor pans 24-27, as well as the remaining open areas of building floor 3. As a result, raceways 4 and 5 are both fully enclosed, and are mutually separated, with connector bridges 29 serving to permit cross-over between raceways 4 and 5, while maintaining physical isolation or separation. In the event local regulations specify that existing building floors can not qualify as an electrical barrier, a sheet of insulating material can be applied over building floor 3 prior to assembly of floor construction 2 thereon to improve its utility distribution capabilities, particularly with respect to utility raceway 5.

The disclosed utility distribution system 1 (FIG. 1) also includes utility posts 9 which interact with floor construction 2 to distribute utilities to the various workstations. With reference to FIGS. 32-38, each of the illustrated utility posts 9 has a channel-like, elongated post portion 126, and a foot portion 10 shaped similar to cover plate 28, such that a cover plate 28 can be removed from floor pans 24-27, and the foot portion 10 of a utility post 9 mounted in its place. Utility posts 9 preferably have a rigid construction for upright mounting on floor construction 2, and may be provided in a plurality of different lengths or heights to accommodate a variety of needs and uses. With reference to FIG. 35, utility post foot 10 has a generally square overall plan configuration, similar to that of cover plate 28, and is defined by side edges 130-133, and upper and lower surfaces 134 and 135 respectively. Each of the side edges 130-133 of utility post foot 10 has an open, notched out area 31-36 located at a generally medial or central portion thereof. Each of the open foot notches 31–36 is defined by a base edge 137, and opposing side edges 138 oriented in a generally U-shaped plan configuration. Utility post foot 10 includes perpendicularly oriented fastener apertures 139 extending through each corner thereof, identical to the arrangement of fastener apertures 113 on cover plate 28.

As best illustrated in FIG. 34, the post portion 126 of utility post 9 has a generally X-shaped transverse cross-sectional configuration, comprising two parallel pairs of flat, perpendicularly intersecting walls 142–145. Intersecting walls 142–146 define a plurality of outwardly oriented, open-faced channels, which include four generally U-shaped mounting channels 148–151, and four generally V-shaped utility channels 13–16. The four mounting channels 148–151 are oppositely oriented in an outwardly radiating fashion, as are utility channels 13–16, which are positioned inbetween adjacent mounting channels 148–151. Mounting channel 148 is defined by wall segments 154–156, mounting channel 149 is defined by wall segments 157–159, mounting channel 150 is defined by wall segments 160–162, and mounting channel 151 is defined by wall segments 163–165. Utility channel 13 is defined by wall segments 154 and 165, utility channel 14 is defined by wall segments 155 and 157, utility channel 15 is defined by wall segments 159 and 160, and utility channel 16 is defined by wall segments 162 and 163. Four triangularly shaped gusset channels 166 interconnect the lower portion of post portion 126 with foot portion 10, and each includes a pair of sidewalls 167 oriented in radiating alignment with the corner fastener apertures 139 in foot portion 10. As best viewed in FIG. 35, the lower ends of utility channels 13–16 are aligned and communicate with an associated one of the open areas 31–34 of utility post foot 10, while the open ends of mounting channels 148–151 are aligned with the sidewalls 167 of an associated one of the gusset channels 116 on post foot 10.

Each of the utility channels 13–16 (FIGS. 36–38) has a generally triangular transverse cross-sectional configuration, and is adapted to receive and retain therein one or more utility conduits such as wires, cables, tubes, etc. Mounting channels 148–151 have a generally square transverse cross-sectional configuration, and are adapted to receive and retain therein one or more utility outlets 12, such as the illustrated duplex power outlet 168, the illustrated communication junction block 169, and other similar devices. Since mounting channels 148–151 are each generally open along their entire length, each utility channel can receive a plurality of utility outlets therein arranged in a vertically stacked configuration.

With reference to FIGS. 36–38, each of the utility channels 13–16 associated with utility post 9 includes a removable cover 170–173 which selectively encloses the same. In the illustrated example, each of the utility channel covers 170–173 includes a pair of inwardly angled side flanges 174 which matingly engage the outer free edges of the associated channel walls 142–145 to detachably mount the same on utility post 9 with a snap lock type of action. The illustrated utility post 9 also includes four, trapezoid shaped foot covers 178, which are positioned over the lower ends of utility channels 13–16. Each foot cover 178 (FIG. 36) includes an upper edge 179 extending adjacent the bottom on an associated one of the channel covers 170–173, a lower edge 180 extending along the upper surface 134 of post foot 10, and a pair of side edges 181 extending along the free edges of gusset sidewalls 167 to thereby enclose the lower part of each lower post portion 126 which is aligned with an associated utility channel 13–16. Foot covers 178 are detachably mounted to utility post 9 to permit ready access to the underlying raceways 4 and 5 in floor construction 2. Utility post 9 also includes a top cap 182 connected with the upper end of post portion 126, and enclosing the upper ends of each of the utility channels 13–16 and the mounting channels 148–151.

Figure 39:
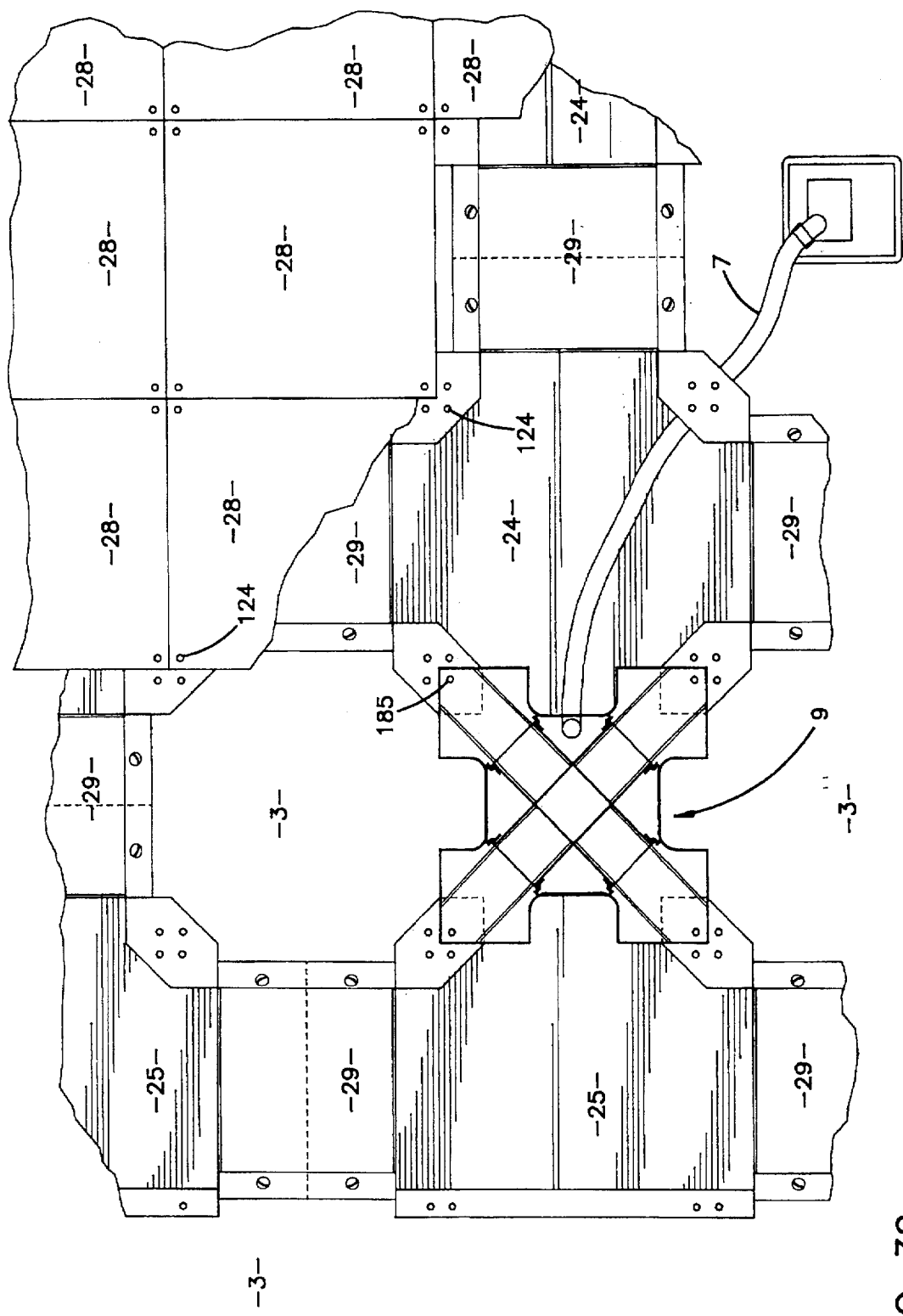
FIG. 39 is a fragmentary, top plan view of the floor construction with a utility post mounted thereon, with utility conduits being routed therethrough.

In operation, utility posts 9 may be assembled on floor construction 2 at any desired location in the following fashion. Assuming that cover plates 28 have been preassembled over each of the selected floor pans 25–27, the cover plate 28 disposed at that location at which each utility post 9 is desired must first be removed by simply removing associated fasteners 124, and detaching the selected cover plate 28 from its underlying floor pan or pans. A utility post 9 is then selected, and the foot portion 10 thereof is placed in the space vacated by the removed cover plate 28, such that foot base plate 112 is supported abuttingly on the underlying pan, such as in the arrangement shown in FIG. 39. Fasteners 185 are then inserted through the fastener aperture 139 in each corner of utility post foot 10, so as to securely mount utility post 9 on floor construction 2. Utility outlets 12 are mounted in the mounting channels 148–151 of utility post 9.

Mounting channels 148–151 are preferably preassigned or designated for use with certain types of utility outlets 12, so as to physically separate those utilities which might experience some degree of physical and/or functional interference. For example, the illustrated mounting channels 148 and 150 are assigned for power outlet devices, such as power outlet 168, and the opposite mounting channels 151 and 159 are assigned for communication junctions and other signal devices, such as signal block 169. Similarly, utility channels 13–16 are preferably preassigned or designated for use with certain types of utilities, such as power lines and signal cables. The illustrated utility channels 14 and 16 are assigned for power lines 7, and utility channels 13 and 15 assigned for signal cables or conductors 8. In any event, each of the various utility outlets 12 desired is mounted in an associated one of the mounting channels 148–152, preferably in accordance with the predesignated configuration noted above.

As best illustrated in FIG. 2, when utility post 9 is mounted on floor construction 2, the utility channels 13–16 are oriented to be in alignment with the underlying utility raceways 4 and 5. More specifically, one oppositely oriented pair of the utility channels 13–16 will open into utility raceway 4, and the other pair of oppositely oriented utility channels 13–16 will open into utility raceway 5. In the system shown in FIG. 2, utility raceway 4 has been designated for electrical power conduits 7, and utility raceway 5 has been designated for signal conduits 8, which include communication lines, data wires, etc. Hence, utility post 9 has been oriented on the X-shaped floor pan 24 to which it is attached with utility channel 16 and U-shaped foot opening 33 communicating with a forwardly facing side of power raceway 4, and utility channel 14 and U-shaped foot opening 31 communicating with a rearwardly facing side of power raceway 4. Furthermore, in this orientation, utility channel 15 and U-shaped foot opening 32 communicate with the forwardly facing side of signal raceway 5, and utility channel 13 and U-shaped foot opening 34 communicate with a rearwardly facing side of signal raceway 5. Power conduits 7 and signal conduits 8 may be fed into floor construction 2 in a variety of different ways, including the floor feed arrangement shown in FIG. 39 for power conduit 7, or the side feed arrangement shown in FIG. 2 for power conduits 7 and signal conduits 8.

With reference to FIG. 3, it will be noted that utility post 9 can be mounted at a plurality of locations on floor construction 2, including mounting on the four pedestals 38 of a single X-shaped floor pan 24, directly above the center portion of its associated base 36, as illustrated utility post 9a, or alternatively between the adjacent legs 105 of a T-shaped floor pan 25 and a X-shaped floor pan 24, directly above the connector bridge 29, as in illustrated utility post 9b, or alternatively on the four pedestals of four adjacent X-shaped floor pans 24, directly above the open building floor 3, as in illustrated utility post 9c. In each of these orientations, the utility channels 13–16 of the utility post 9 can be communicated with the utility raceways 4 and 5 in floor construction 2 to permit routing utilities, such as power conduits 7 and signal conduits 8 therethrough.

Utility conduits 7 and 8 are then routed from their associated raceways 4 and 5 within floor construction to each of the selected utility outlets 12 in the following fashion. Selected cover plates 28 are first removed from around utility post foot 10, so as to expose the underlying raceways 4 and 5, and determine what utility conduits 7 and 8 are readily available. Utility conduits 7 and 8 are then selected and routed into the selected ones of the utility channels 13–16 by first routing the same through that one of the open foot areas 31–34 associated with the selected one of the utility channels 13–16. The utility conduits 7 and 8 are simply laid into the selected utility channels 13–16 by insertion into the open faces 17 thereof to a location adjacent the associated utility outlet 12 to which it is to be connected. An aperture is formed in the wall of post portion 126 disposed between the utility channel and the selected utility outlet, so that the selected utility conduit can be inserted into the utility outlet and thereby connected. After each such utility outlet 12 is similarly connected with its associated utility conduit 7 or 8, channel covers 170–173 are mounted over each utility channel 13–16, and foot covers 178 are mounted at the base of post portion 126.

With reference to FIG. 1, in one embodiment of the present invention, utility posts 9 are positioned freestanding on floor construction 2 adjacent those locations at which the selected utilities are desired. For instance, freestanding utility post 9a is positioned for use with a panel based systems furniture system 190, and may extend up through and/or adjacent associated worksurfaces 191. Utility post 9 might also be positioned between the sides of adjacent partition panels (not shown) to function as a spine with outlets 12 accessible on both sides of the panel system. Alternatively, the illustrated freestanding utility post 9b is used as a bollard for a mobile table system 192.

In yet another embodiment of the present invention, utility post 9 may be physically incorporated into a furniture system. For example, the illustrated utility post 9c is used to support a tabletop 193. Alternatively, the illustrated utility posts 9d are used as support columns in an overhead partitioning system 194, which is the subject of commonly assigned, co-pending U.S. patent application Ser. No. 774, 563. Utility posts 9 might be used as the vertical uprights in the workspace module arrangement which is the subject of commonly assigned, co-pending U.S. patent application Ser. No. 819,396. It is to be understood that utility post 9 may also be used to support a wide variety of other types of furniture applications, such as supports for partition panels, furniture unit supports, etc.

Utility distribution system 1 is quite versatile, and provides not only a unique prefabricated floor construction 2 which is adapted to physically separate different types of utility conduits to avoid interference, but also a novel utility post 9 which permits the distribution of utilities from the floor construction 2 at various locations throughout the system. Utility distribution system 1 is very efficient, and quite adaptable to effectively support a wide variety of different furniture systems and configurations.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A utility floor construction, comprising:

a plurality of irregularly shaped floor pans adapted for abutting support directly on a floor surface in a mutually adjacent pattern wherein the coverage of the floor surface is noncontinuous; each of said floor pans having a generally U-shaped vertical cross-sectional configuration defined by a base and upstanding sidewalls; each floor pan base including a central portion and at least one leg portion which extends outwardly of said central portion to collectively define at least a portion of a first raceway in which first utilities can be routed and an exterior of said floor pan defining at least a portion of a second raceway in which second utilities can be routed;

a plurality of rigid cover plates supported on said floor pans in a mutually adjacent arrangement to define at least a portion of a continuous floor surface thereover;

a plurality of separator bridges, each having a generally U-shaped transverse vertical cross-sectional configuration defined by a central plate and upstanding sidewalls which define at least a portion of said second raceway;

each of said floor pan central portions having at least one of said cover plates positioned over the associated central portion to enclosed the same;

each of said floor pan leg portions having one of said separator bridges positioned on top of the associated leg portion and extending laterally thereacross, with the sidewalls of said one separator bridge being disposed above, and oriented substantially perpendicular to the sidewalls of said associated floor pan leg portion, whereby when said floor pans and separator bridges are positioned adjacent one another on the floor surface the leg portions of adjacent floor pans abut end-to-end so that said first raceway is shielded from the floor surface and extends continuously through said floor construction, said adjacent floor pans define an open floor space therebetween which defines at least a portion of said second raceway and said separator bridges physically separate said second raceway from said first raceway to positively prevent the second utilities from coming into contact with the first utilities and thereby minimize interference therebetween.

2. A utility floor construction as set forth in claim 1, wherein:

said separator bridges are connected to said associated leg portions of said floor pans to automatically isolate said first and second raceways.

3. A utility floor construction as set forth in claim 2, wherein:

said floor pan sidewalls associated with said central portions have upper edges; and said cover plates have lower surfaces which generally abut the upper edges of said sidewalls associated with the central portions of said floor pans.

4. A utility floor construction as set forth in claim 3, wherein:

said sidewalls of said separator bridges abut the lower surfaces of said cover plates to isolate said second raceway from said first raceway.

5. A utility floor construction as set forth in claim 4, wherein:
each said separator bridge has a width measured between said bridge sidewalls that is substantially commensurate with the length of an associated floor pan leg portion.

6. A utility floor construction as set forth in claim 5, wherein:
said cover plates extend over each of said floor pans and each of said separator bridges to enclose both of said first and second raceways.

7. A utility floor construction as set forth in claim 6, wherein:
each of said separator bridges spans between the leg portions of two adjacent ones of said floor pans arranged end-to-end, and is connected with said leg portions to physically interconnect said adjacent ones of said floor pans.

8. A utility floor construction as set forth in claim 7, wherein:
adjacent ones of said floor pans define an open floor space therebetween, which defines at least a portion of said second raceway; and
said sidewalls of said connector bridge associated with said adjacent ones of said floor pans open to said open floor space.

9. A utility floor construction as set forth in claim 8, wherein:
each of said separator bridges has a pair of depending sidewalls which extend downwardly from said central portion and are positioned opposite said upstanding sidewalls.

10. A utility floor construction as set forth in claim 9, including:
threaded fasteners detachably connecting the depending sidewalls of said separator bridges to the leg portions of said floor pans.

11. A utility floor construction as set forth in claim 10, wherein:
said floor pans include X-shaped floor pans, T-shaped floor pans, and L-shaped floor pans.

12. A utility floor construction as set forth in claim 11, wherein:
each of said X-shaped floor pans includes four raised pedestals positioned adjacent opposite corners thereof to support an associated one of said cover plates thereon.

13. A utility floor construction as set forth in claim 12, wherein:
each of said T-shaped floor pans includes two raised pedestals positioned adjacent opposite corners thereof to support at least a portion of an associated one of said cover plates thereon.

14. A utility floor construction as set forth in claim 13, wherein:
each of said L-shaped floor pans includes at least one raised pedestal positioned adjacent an interior corner thereof to support at least a portion of an associated one of said cover plates thereon.

15. A utility floor construction as set forth in claim 1, wherein:
said floor pan sidewalls associated with said central portions have upper edges; and
said cover plates have lower surfaces which generally abut the upper edges of said sidewalls associated with the central portions of said floor pans.

16. A utility floor construction as set forth in claim 15, wherein:
said sidewalls of said separator bridges abut the lower surfaces of said cover plates to isolate said second raceway from said first raceway.

17. A utility floor construction as set forth in claim 1, wherein:
each said separator bridge has a width measured between said bridge sidewalls that is substantially commensurate with the length of an associated floor pan leg portion.

18. A utility floor construction as set forth in claim 1, wherein:
said cover plates extend over each of said floor pans and each of said separator bridges to enclose both of said first and second raceways.

19. A utility floor construction as set forth in claim 1, wherein:
each of said separator bridges spans between the leg portions of two adjacent ones of said floor pans arranged end-to-end, and is connected with said leg portions to physically interconnect said adjacent ones of said floor pans.

20. A utility floor construction as set forth in claim 1, wherein:
adjacent ones of said floor pans define an open floor space therebetween which defines at least a portion of said second raceway; and
said sidewalls of said separator bridge associated with said adjacent ones of said floor pans open to said open floor space.

21. In a utility floor construction, the improvement of a floor pan and connector bridge construction, comprising:
at least two floor pans adapted for abutting support directly on a floor surface in a mutually adjacent relationship; each of said floor pans including a central portion and at least one leg portion which extends outwardly of said central portion to an end edge thereof, and has a generally U-shaped vertical cross-sectional configuration defined by a base and upstanding pan sidewalls; said leg portion having a length measured longitudinally along said pan sidewalls to said end edge, and a width measured laterally between said pan sidewalls;
at least one connector bridge having a generally U-shaped transverse vertical cross-sectional configuration defined by a central plate with opposite end edges, and upstanding bridge sidewalls; said connector bridge having a width measured between said bridge sidewalls which is substantially greater than the length of one of said floor pan leg portions, and a length measured between said central plate end edges which is at least as great as the width of one of said floor pan leg portions;
said floor pans being positioned with the end edges of adjacent leg portions aligned and in abutment, and said connector bridge spanning between and connected with said adjacent leg portions, with said bridge sidewalls being disposed above, and oriented non-parallel to said pan sidewalls to rigidly interconnect said floor pans.

22. A utility floor construction as set forth in claim 21, wherein:
said bridge sidewalls are oriented substantially perpendicular to said pan sidewalls to rigidly interconnect said floor pans.

23. A utility floor construction as set forth in claim 22, wherein:

each of said separator bridges has a pair of depending bridge sidewalls which extend downwardly from said central portion and are positioned opposite said upstanding bridge sidewalls.

24. A utility floor construction as set forth in claim 23, wherein:

threaded fasteners detachably connecting the depending bridge sidewalls of said separator bridges to the leg portions of said floor pans.

25. A utility floor construction as set forth in claim 24, wherein:

said floor pans include X-shaped floor pans, T-shaped floor pans, and L-shaped floor pans.

26. A utility floor construction as set forth in claim 25, wherein:

each of said X-shaped floor pans includes four raised pedestals positioned adjacent opposite corners thereof.

27. A utility floor construction as set forth in claim 26, wherein:

each of said T-shaped floor pans includes two raised pedestals positioned adjacent opposite corners thereof.

28. A utility floor construction as set forth in claim 27, wherein:

each of said L-shaped floor pans includes at least one raised pedestal positioned adjacent an interior corner thereof.

29. A utility floor construction as set forth in claim 28, including:

a plurality of rigid cover plates supported on the pedestals of said floor pans in a mutually adjacent arrangement to define at least a portion of a continuous floor surface thereover.

30. A utility floor construction as set forth in claim 29, wherein:

said floor pans collectively define at least a portion of a raceway in which an associated utility can be routed.

31. A utility floor construction, comprising:

a plurality of floor pans adapted for abutting support directly on a floor surface in a mutually adjacent, lattice-like arrangement, wherein each one of said floor pans has a generally U-shaped configuration and a base which defines at least a portion of a first raceway that extends generally continuously throughout said floor construction and is adapted to route a first utility therein;

a plurality of rigid cover plates supported on said floor pans in a mutually adjacent arrangement to generally enclose said first raceway, and define a continuous floor surface thereover;

a second raceway disposed below said floor surface, physically separate from said first raceway, and adapted to route a second utility therein; and a plurality of connector bridges extending between adjacent ones of said floor pans, and being attached thereto to physically interconnect the same; said connector bridges each including a separator plate positioned a spaced apart distance above the bases of the adjacent floor pans to form thereunder a portion of said first raceway, and a spaced apart distance below the overlying cover plates to form a portion of said second raceway to permit crossing the first and second utilities while maintaining physical separation of the same to alleviate interference therebetween.

32. A utility floor construction as set forth in claim 31, wherein:

said cover plates extend over each of said floor pans and each of said separator bridges to enclose both of said first and second raceways.

33. A utility floor construction as set forth in claim 32, wherein:

each of said connector bridges has a pair of depending sidewalls which extend downwardly from said separator plate, and are attached to said floor pans.

34. A utility floor construction as set forth in claim 33, including:

threaded fasteners detachably connecting the depending sidewalls of said connector bridges to said floor pans.

35. A utility floor construction as set forth in claim 34, wherein:

each of said connector bridges has a pair of upstanding sidewalls which extend upwardly from said separator plate, and are positioned opposite said depending sidewalls.

36. A utility floor construction as set forth in claim 35, wherein:

said floor pans include X-shaped floor pans.

37. A utility floor construction as set forth in claim 36, wherein:

each of said X-shaped floor pans includes four raised pedestals positioned adjacent opposite corners thereof to support an associated one of said cover plates thereon.

38. A utility floor construction as set forth in claim 37, wherein adjacent ones of said floor pans have an open floor space therebetween which defines at least a portion of said second raceways; and said upstanding sidewalls of said connector bridge associated with said adjacent ones of said floor pans open to said open floor space.

39. A utility floor construction as set forth in claim 38, wherein:

said floor pans have sidewalls with upper edges associated with said central portions; and said cover plates have lower surfaces which generally abut the upper edges of said sidewalls associated with the central portions of said floor pans.

40. A utility floor construction as set forth in claim 39, wherein:

said upstanding sidewalls of said separator bridges abut the lower surfaces of said cover plates to isolate said second raceway from said first raceway.

41. In a utility floor construction for open space plans and the like, of the type having a raised floor surface with first and second utility raceways thereunder, the improvement comprising:

an irregularly shaped floor pan adapted for abutting support on a building support surface, and having a generally U-shaped configuration and a base which defines at least a portion of the first raceway that extends generally continuously throughout said floor construction and an exterior which defines on the building support surface at least a portion of the second raceway that extends generally continuously throughout said floor construction;

a rigid cover plate supported on said floor pan to generally enclose the first raceway, and define at least a portion of the raised floor surface; and a connector bridge attached to said floor pan, and projecting therefrom to an adjacent portion of said raised floor construction; said connector bridge including a separator plate positioned a spaced apart distance above the base of said floor pan to form thereunder a portion of the first raceway, and a spaced apart distance below said cover plate to form thereover a portion of the second raceway.

42. A utility floor construction as set forth in claim 41, wherein:

said cover plate extends over said floor pan and said separator bridge to enclose both of said first and second raceways.

43. A utility floor construction as set forth in claim 42, wherein:

said connector bridge has a pair of depending sidewalls which extend downwardly from said separator plate, and are attached to said floor pan.

44. A utility floor construction as set forth in claim 43, including:

threaded fasteners detachably connecting the depending sidewalls of said connector bridge to said floor pan.

45. A utility floor construction as set forth in claim 44, wherein:

said connector bridge has a pair of upstanding sidewalls which extend upwardly from said separator plate, and are positioned opposite said depending sidewalls.

46. A utility floor construction as set forth in claim 45, wherein:

said floor pan is an X-shaped floor pan.

47. A utility floor construction as set forth in claim 46, wherein:

said X-shaped floor pan includes four raised pedestals positioned adjacent opposite corners thereof to support said cover plate thereon.

48. A utility floor construction as set forth in claim 47, wherein:

said floor pan has an open floor space disposed therealong which defines at least a portion of said second raceway; and said upstanding sidewalls of said connector bridge open to said open floor space.

49. A utility floor construction as set forth in claim 48, wherein:

said floor pan has sidewalls with upper edges associated with said central portion; and said cover plate has a lower surface which generally abuts the upper edge of the sidewalls associated with the central portion of said floor pan.

50. A utility floor construction as set forth in claim 49, wherein:

said upstanding sidewalls of said separator bridge abut the lower surface of said cover plate to isolate said second raceway from said first raceway.

51. In a utility floor construction, the improvement of a base module, comprising:

at least four X-shaped floor pans adapted for abutting support directly on a floor surface in a mutually adjacent relationship; each of said floor pans including a central portion, and at least four leg portions which extend outwardly of said central portion and have a generally U-shaped vertical cross-sectional configuration defined by a base and upstanding pan sidewalls; said floor pans being positioned with ends of adjacent leg portions aligned and in abutment to form a portion of a first raceway within said floor pans, and a portion of a second raceway without said floor pans;

at least four connector bridges rigidly interconnecting said floor pans; each of said bridges having a generally U-shaped transverse vertical cross-sectional configuration defined by a central plate below which a portion of the first raceway is disposed, and upstanding sidewalls between which a portion of the second raceway is disposed;

said connector bridges spanning between and connected with said adjacent leg portions of said floor pans, with said bridge sidewalls being disposed above, and oriented substantially perpendicular to the associated pan sidewalls to rigidly interconnect said floor pans, and separate the first and second raceways.

52. A utility floor construction as set forth in claim 51, wherein:

each of said connector bridges has a pair of depending sidewalls which extend downwardly from said separator plate opposite said upstanding sidewalls, and are attached to said floor pans.

53. A utility floor construction as set forth in claim 52, including:

threaded fasteners detachably connecting the depending sidewalls of said connector bridges to said floor pans.

54. A utility floor construction as set forth in claim 53, including:

a plurality of rigid cover plates supported on said floor pans in a mutually adjacent arrangement.

55. A utility floor construction as set forth in claim 54, wherein:

said cover plates extend over each of said floor pans and each of said separator bridges to enclose both of said first and second raceways.

56. A utility floor construction as set forth in claim 55, wherein:

each of said X-shaped floor pans includes four raised pedestals positioned adjacent opposite corners thereof to support an associated one of said cover plates thereon.

57. A utility floor construction as set forth in claim 56, wherein:

adjacent ones of said floor pans have an open floor space therebetween which defines at least a portion of said second raceway; and said upstanding sidewalls of said connector bridge associated with said adjacent ones of said floor pans open to said open floor space.

58. A utility floor construction as set forth in claim 57, wherein:

said floor pans sidewalls associated with said central portions have upper edges; and said cover plates have lower surfaces which generally abut the upper edges of said sidewalls associated with the central portions of said floor pans.

59. A utility floor construction as set forth in claim 58, wherein:

said upstanding sidewalls of said separator bridges abut the lower surfaces of said cover plates to isolate said second raceway from said first raceway.

60. A utility floor construction as set forth in claim 59, wherein:

said floor pans and connector bridges are arranged to assume a checkerboard plan configuration.

61. A utility floor construction, comprising:

a plurality of floor pans adapted for abutting support directly on a floor surface in a mutually adjacent pattern; each of said floor pans having a generally U-shaped vertical cross-sectional configuration defined by a base and upstanding sidewalls; each floor pan base including a central portion and at least one leg portion which extends outwardly of said central portion to collectively define at least a portion of a first raceway in which first utilities can be routed;

a plurality of rigid cover plates supported on said floor pans in a mutually adjacent arrangement to define at least a portion of a continuous floor surface thereover;

a plurality of separator bridges, each having a generally U-shaped transverse vertical cross-sectional configuration defined by a central plate and upstanding sidewalls which define at least a portion of a second raceway in which second utilities can be routed;

each of said floor pan central portions having at least one of said cover plates positioned over the associated central portion to enclosed the same;

each of said floor pan leg portions having one of said separator bridges positioned on top of the associated leg portion and extending laterally thereacross, with the sidewalls of said one separator bridge being disposed above, and oriented substantially perpendicular to the sidewalls of said associated floor pan leg portion, whereby when said floor pans and separator bridges are positioned adjacent one another on the floor surface the leg portions of adjacent floor pans abut end-to-end so that said first raceway is shielded from the floor surface and extends continuously through said floor construction, each of said separator bridges spans between the leg portions of two adjacent ones of said floor pans arranged end-to-end, and is connected with said leg portions to physically interconnect said adjacent ones of said floor pans, and said separator bridges physically separate said second raceway from said first raceway to positively prevent the second utilities from coming into contact with the first utilities and thereby minimize interference therebetween.

62. A utility floor construction as set forth in claim 61, wherein:

adjacent ones of said floor pans define an open floor space therebetween, which defines at least a portion of said second raceway; and said sidewalls of said connector bridge associated with said adjacent ones of said floor pans open to said open floor space.

63. A utility floor construction as set forth in claim 62, wherein:

each of said separator bridges has a pair of depending sidewalls which extend downwardly from said central portion and are positioned opposite said upstanding sidewalls.

64. A utility floor construction as set forth in claim 63, including:

threaded fasteners detachably connecting the depending sidewalls of said separator bridges to the leg portions of said floor pans.

65. A utility floor construction as set forth in claim 64, wherein:

said floor pans include X-shaped floor pans, T-shaped floor pans, and L-shaped floor pans.

66. A utility floor construction as set forth in claim 65, wherein:

each of said X-shaped floor pans includes four raised pedestals positioned adjacent opposite corners thereof to support an associated one of said cover plates thereon.

67. A utility floor construction as set forth in claim 66, wherein:

each of said T-shaped floor pans includes two raised pedestals positioned adjacent opposite corners thereof to support at least a portion of an associated one of said cover plates thereon.

68. A utility floor construction as set forth in claim 67, wherein:

each of said L-shaped floor pans includes at least one raised pedestal positioned adjacent an interior corner thereof to support at least a portion of an associated one off said cover plates thereon.

* * * * *

UNITED STATES PATENT AND TRADEMARK OFFICE
CERTIFICATE OF CORRECTION

PATENT NO.   : 5,697,193
DATED        : December 16, 1997
INVENTORS    : Carl V. Forslund, III et al.

It is certified that error appears in the above-identified patent and that said Letters Patent is hereby corrected as shown below:

Column 6, line 45;
    "therein" should be --thereon--.

Column 7, line 50;
    "pedestal 69" should be --pedestal 67--.

Column 8, line 30;
    "detachably" should be --detachable--.

Column 9, lines 32-33;
    "pan base" should be --pan bases--.

Column 14, claim 1, line 35;
    "enclosed" should be --enclose--.

Column 21, claim 61, line 20;
    "enclosed" should be --enclose--.

Column 22, claim 68, line 40;
    "off" should be --of--.

Signed and Sealed this

Seventh Day of April, 1998

Attest:

BRUCE LEHMAN

*Attesting Officer*    *Commissioner of Patents and Trademarks*